(12) United States Patent
Yasue

(10) Patent No.: US 11,348,499 B2
(45) Date of Patent: May 31, 2022

(54) INTEGRATED CIRCUIT DEVICE, ELECTRONIC APPARATUS, AND VEHICLE

(71) Applicant: Seiko Epson Corporation, Tokyo (JP)

(72) Inventor: Tadashi Yasue, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/386,815

(22) Filed: Jul. 28, 2021

(65) Prior Publication Data

US 2022/0036784 A1 Feb. 3, 2022

(30) Foreign Application Priority Data

Jul. 29, 2020 (JP) .............................. JP2020-128093

(51) Int. Cl.
*G09G 3/18* (2006.01)
*G09G 3/36* (2006.01)
*B60K 35/00* (2006.01)

(52) U.S. Cl.
CPC .............. *G09G 3/18* (2013.01); *B60K 35/00* (2013.01); *G09G 3/3614* (2013.01);
(Continued)

(58) Field of Classification Search
CPC ............ G02F 1/136286; G02F 1/1368; G02F 2201/40; G02F 2201/52; G09G 3/3607; G09G 3/3614; G09G 3/3648; G09G 2300/0426; G09G 2300/0452; G09G 2300/0465; G09G 2320/0242; G09G 2330/021; G09G 3/364; G09G 3/3685; G09G 2310/027; G09G 2320/0209; G09G 2320/0276; G09G 2320/0673; G09G 2320/0686; G09G 3/3655; H01L 27/124; H01L 29/785; H01L 29/78696
See application file for complete search history.

(56) References Cited

U.S. PATENT DOCUMENTS

| 4,692,760 A | 9/1987 | Unno et al. |
| 5,877,733 A | 3/1999 | Uchida et al. |

(Continued)

FOREIGN PATENT DOCUMENTS

| JP | S59-149195 U | 10/1984 |
| JP | S61-032092 A | 2/1986 |

(Continued)

*Primary Examiner* — Nelson M Rosario
(74) *Attorney, Agent, or Firm* — Harness, Dickey & Pierce, P.L.C.

(57) ABSTRACT

An integrated circuit device includes a voltage supply circuit and a drive circuit. The voltage supply circuit supplies a common voltage, a first positive polarity voltage higher than the common voltage, a second positive polarity voltage higher than the first positive polarity voltage, a first negative polarity voltage lower than the common voltage, and a second negative polarity voltage lower than the first negative polarity voltage. The drive circuit outputs a first drive waveform signal for dot matrix display based on the common voltage, the first positive polarity voltage, the second positive polarity voltage, the first negative polarity voltage, and the second negative polarity voltage, and outputs a second drive waveform signal for segment display based on the common voltage, the first positive polarity voltage, and the first negative polarity voltage.

11 Claims, 14 Drawing Sheets

(52) U.S. Cl.
CPC .. *B60K 2370/1523* (2019.05); *B60K 2370/52* (2019.05); *G09G 2310/06* (2013.01); *G09G 2320/066* (2013.01); *G09G 2380/10* (2013.01)

(56) References Cited

U.S. PATENT DOCUMENTS

| | | |
|---|---|---|
| 2005/0206594 A1 | 9/2005 | Suzuki |
| 2017/0256228 A1* | 9/2017 | Lee ................... G09G 3/3614 |
| 2021/0090515 A1* | 3/2021 | Huang ................ G09G 3/3614 |

FOREIGN PATENT DOCUMENTS

| | | |
|---|---|---|
| JP | H05-289646 A | 11/1993 |
| JP | H06-167942 A | 6/1994 |
| JP | H08-184687 A | 7/1996 |
| JP | H09-130283 A | 5/1997 |
| JP | 2002-351378 A | 12/2002 |
| JP | 2005-266389 A | 9/2005 |
| JP | 2006-126677 A | 5/2006 |
| JP | 2006-276207 A | 10/2006 |
| JP | 2011-158705 A | 8/2011 |

\* cited by examiner

INTEGRATED CIRCUIT DEVICE, ELECTRONIC APPARATUS, AND VEHICLE

BACKGROUND

The present application is based on, and claims priority from JP Application Serial Number 2020-128093, filed Jul. 29, 2020, the disclosure of which is hereby incorporated by reference herein in its entirety.

1. Technical Field

The present disclosure relates to an integrated circuit device, an electronic apparatus, and a vehicle.

2. Related Art

JP-A-9-130283 discloses a liquid crystal display device that performs segment display and dot matrix display on a single liquid crystal display panel. The liquid crystal display device includes a first liquid crystal driver that drives a first liquid crystal display unit that performs the dot matrix display, a second liquid crystal driver that drives a second liquid crystal display unit that performs the segment display, a first driving power supply that supplies a driving voltage for driving the first liquid crystal display unit to the first liquid crystal driver, and a second driving power supply that supplies a driving voltage for driving the second liquid crystal display unit to the second liquid crystal driver. The liquid crystal display device further includes a DC cut circuit that cuts a DC component of the voltage supplied by the second liquid crystal driver, and a bias circuit that applies a bias voltage to an output from which the DC component is cut.

When the segment display and the dot matrix display are performed on the single liquid crystal display panel, burn-in occurs in the liquid crystal display panel when a center voltage of the driving voltage for performing the segment display is different from a center voltage of the driving voltage for performing the dot matrix display. In JP-A-9-130283, providing the DC cut circuit and the bias circuit makes the two center voltages equal. However, in JP-A-9-130283, the first driving power supply and the first liquid crystal driver are provided for the dot matrix display, and the second driving power supply and the second liquid crystal driver are provided for the segment display separately from the first driving power supply and the first liquid crystal driver. Further, the DC cut circuit and the bias circuit are necessary to make the center voltages equal, and an increase in cost due to an increase in circuit scale is expected.

SUMMARY

An aspect of the present disclosure relates to an integrated circuit device. The integrated circuit device includes: a voltage supply circuit configured to supply a common voltage, a first positive polarity voltage higher than the common voltage, a second positive polarity voltage higher than the first positive polarity voltage, a first negative polarity voltage lower than the common voltage, and a second negative polarity voltage lower than the first negative polarity voltage; and a drive circuit configured to output a first drive waveform signal for dot matrix display based on the common voltage, the first positive polarity voltage, the first negative polarity voltage, and the second negative polarity voltage, and output a second drive waveform signal for segment display based on the common voltage, the first positive polarity voltage, and the first negative polarity voltage.

Another aspect of the present disclosure relates to an electronic apparatus including the integrated circuit device described above.

Still another aspect of the present disclosure relates to a vehicle including the integrated circuit device described above.

DESCRIPTION OF EXEMPLARY EMBODIMENTS

Hereinafter, a preferred embodiment of the present disclosure will be described in detail. The present embodiment to be described below does not unduly limit contents described in the appended claims, and all configurations described in the present embodiment are not necessarily essential constituent elements.

1. Liquid Crystal Display Device and Integrated Circuit Device

Figure 1:
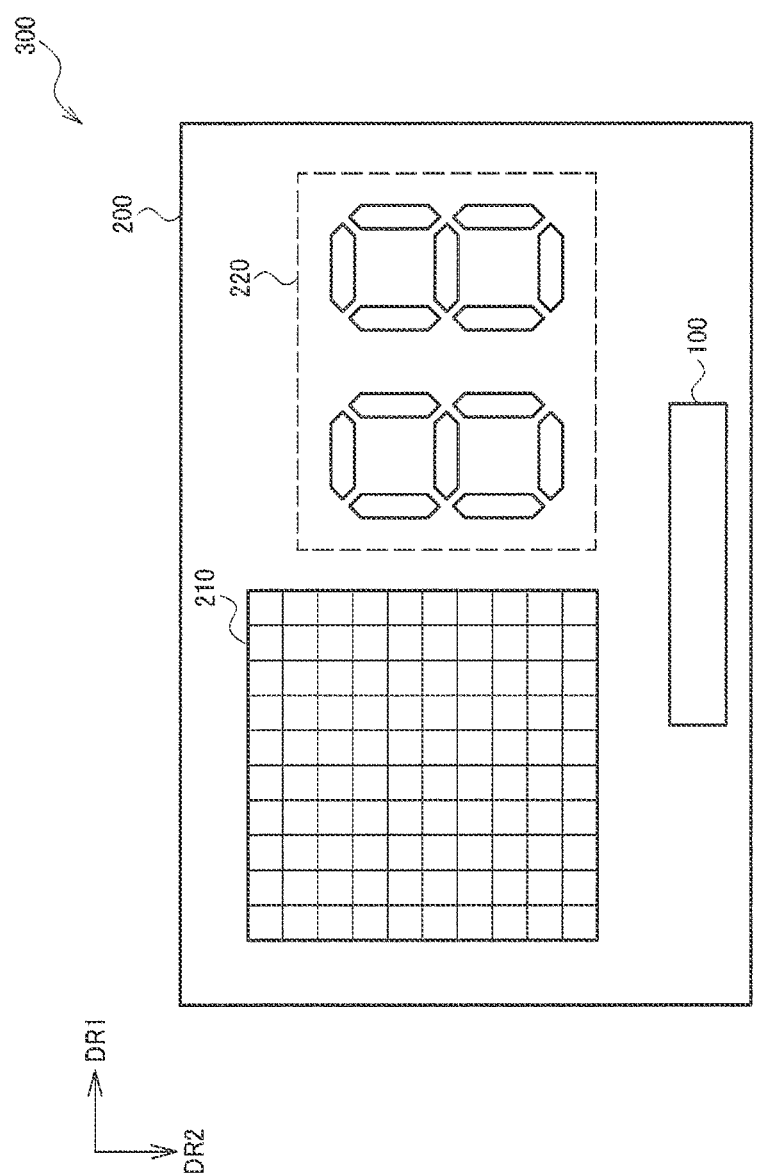
FIG. 1 is a plan view of a configuration example of a liquid crystal display device.

FIG. 1 is a plan view of a configuration example of a liquid crystal display device 300. The liquid crystal display device 300 includes a liquid crystal display panel 200 and an integrated circuit device 100. The configuration of the liquid crystal display device 300 is not limited to FIG. 1. For example, FIG. 1 shows an example in which the integrated circuit device 100 is COG-mounted, but a method for mounting the integrated circuit device 100 is not limited to the COG-mounting.

The liquid crystal display panel 200 is a liquid crystal display panel provided with a dot matrix display unit 210 and a segment display unit 220. The dot matrix display unit 210 performs display by a plurality of dots disposed in a matrix. The segment display unit 220 displays a display object by applying a drive waveform signal to an electrode formed in advance in a shape of the display object. The segment display unit 220 is disposed, for example, on a first direction DR1 side of the dot matrix display unit 210. An arrangement of the display units is not limited to that shown in FIG. 1. For example, the segment display unit may be disposed on both sides of the dot matrix display unit, or the dot matrix display unit and the segment display unit may be disposed along a second direction DR2. The second direction DR2 is orthogonal to the first direction DR1.

The liquid crystal display panel 200 includes two glass substrates and a liquid crystal sealed therebetween. Electrodes and signal lines are formed at each glass substrate by a transparent conductive film. The integrated circuit device 100 COG-mounted at one of the two glass substrates is coupled to the electrodes by the signal lines. COG is an abbreviation for chip on glass. The transparent conductive film is, for example, a thin film of ITO, and ITO is an abbreviation for indium tin oxide. A plurality of column electrodes to which a drive waveform signal for dot matrix display is applied, are disposed in the dot matrix display unit 210 of one glass substrate. A plurality of row electrodes, to which a common drive waveform signal for dot matrix display is applied, are disposed in the dot matrix display unit 210 of the other glass substrate. For example, the column electrodes are linear electrodes along the second direction DR2, the row electrodes are linear electrodes along the first direction, and an intersection of the column electrodes and the row electrodes is a dot for dot matrix display. Further, a plurality of segment electrodes, to which a drive waveform signal for segment display is applied, are disposed in the segment display unit 220 of one glass substrate. One or a plurality of common electrodes, to which a common drive waveform signal for segment display is applied, are disposed in the segment display unit 220 of the other glass substrate. The segment electrodes face the one or one of a plurality of common electrodes. A region in which the segment electrodes and the common electrodes face each other is a display region of a display object indicated by the segment electrodes.

The integrated circuit device 100 is a display driver of the liquid crystal display panel 200. The integrated circuit device 100 drives the dot matrix display unit 210 by outputting the drive waveform signal for dot matrix display to the column electrodes and outputting the common drive waveform signal for dot matrix display to the row electrodes. The drive waveform signal for dot matrix display is also referred to as a first drive waveform signal. Further, the integrated circuit device 100 drives the segment display unit 220 by outputting the drive waveform signal for segment display to the segment electrodes and outputting the common drive waveform signal for segment display to the common electrodes. The drive waveform signal for segment display is also referred to as a second drive waveform signal. The integrated circuit device 100 is a one-chip integrated circuit device capable of simultaneously driving the dot matrix display unit 210 and the segment display unit 220. The integrated circuit device 100 is disposed on a side of the liquid crystal display panel 200 so that a long side of the integrated circuit device 100 is parallel to the side of the liquid crystal display panel 200. The integrated circuit device 100 is disposed, for example, on a second direction DR2 side of the dot matrix display unit 210 and the segment display unit 220. The integrated circuit device 100 is formed of a semiconductor chip, and a terminal thereof is coupled to a signal line of a conductive thin film formed at the glass substrate of the liquid crystal display panel 200.

Figure 2:
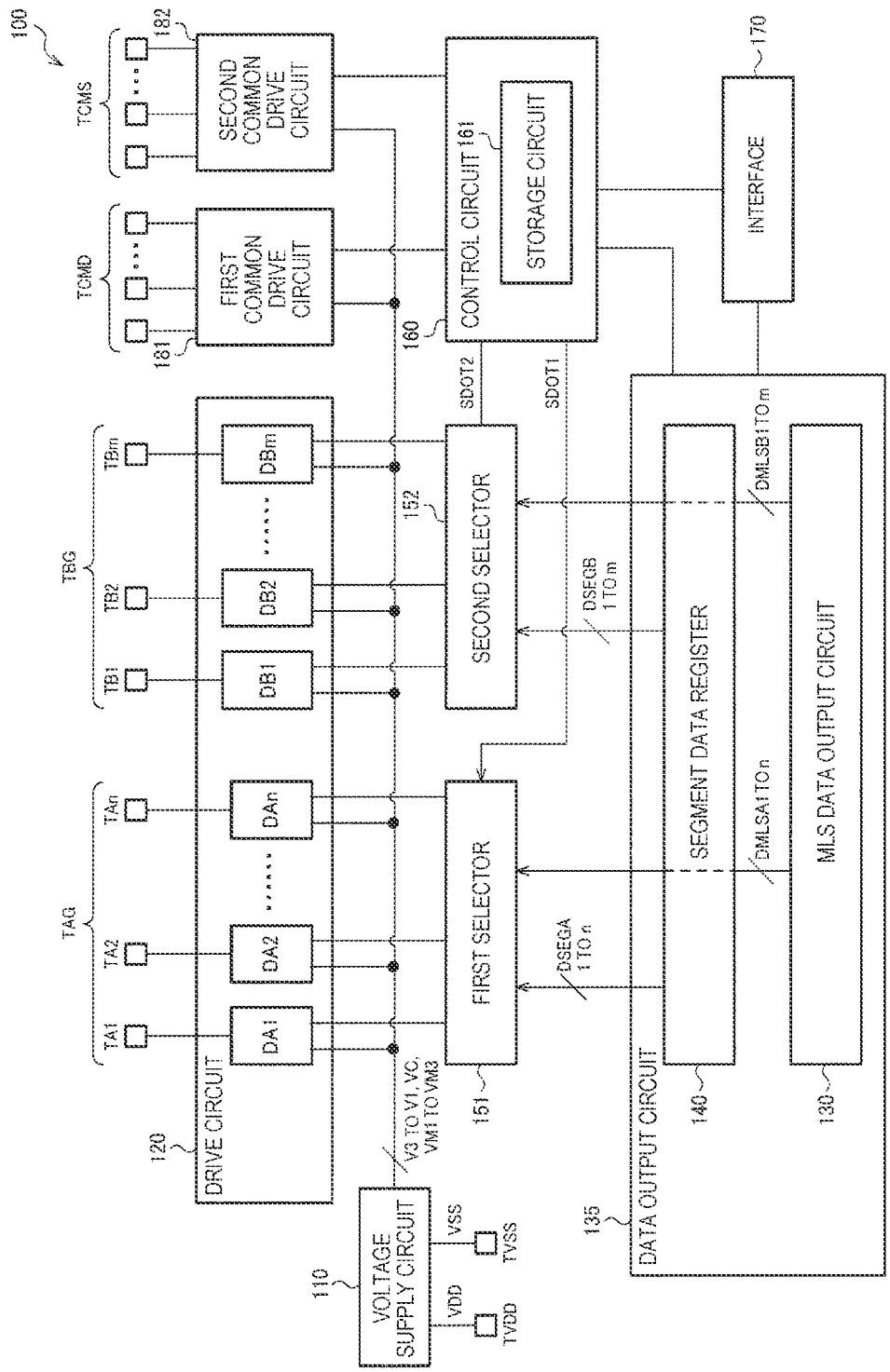
FIG. 2 is a configuration example of an integrated circuit device.

FIG. 2 is a configuration example of the integrated circuit device 100. The integrated circuit device 100 includes a voltage supply circuit 110, a drive circuit 120, a data output circuit 135, a first selector 151, a second selector 152, a control circuit 160, an interface 170, a first common drive circuit 181, a second common drive circuit 182, a first output terminal group TAG, a second output terminal group TBG, a first common terminal group TCMD, a second common terminal group TCMS, a power supply terminal TVDD, and a ground terminal TVSS. Although two output terminal groups are shown in FIG. 2, three or more output terminal groups may be provided. In this case, a configuration of the drive circuit 120 associated with each output terminal group, a function of each output terminal group, and the like are the same as those of the first output terminal group.

The interface 170 receives display data for dot matrix display and segment data for segment display from a processing device provided outside the integrated circuit device 100. Further, the interface 170 may receive setting information on the output terminal group from the processing device. The interface 170 includes, for example, a serial or parallel data interface.

The control circuit 160 outputs the display data for dot matrix display received by the interface 170 to an MLS data output circuit 130, and outputs the segment data for segment display received by the interface 170 to a segment data register 140. The control circuit 160 sets the first output terminal group TAG for dot matrix display or segment display by outputting a select signal SDOT1 to the first selector 151, and sets the second output terminal group TBG for dot matrix display or segment display by outputting a select signal SDOT2 to the second selector 152. The control circuit 160 includes a storage circuit 161 that stores a select signal as the setting information on the output terminal group. The storage circuit 161 is a register, an RAM, a nonvolatile memory, and the like. For example, the select signal may be stored in advance in a nonvolatile memory, or a select signal received by the interface 170 from the external processing device may be stored in a register or an RAM. The control circuit 160 includes a logic circuit. The MLS is an abbreviation of multi-line selection. In the present embodiment, an MLS method is used as a driving method of the dot matrix display. However, in the present disclosure, the driving method of the dot matrix display is not limited to the MLS method, and may be an AP method which is a single line selection method. AP is an abbreviation of alt pleshko.

The data output circuit 135 outputs data to the first selector 151 and the second selector 152. The data output circuit 135 includes the MLS data output circuit 130 and the segment data register 140.

The MLS data output circuit 130 outputs MLS data DMLSA1 to DMLSAn and DMLSB1 to DMLSBm for dot matrix display. Each of n and m is an integer of 2 or more, and n and m may be the same as or different from each other. The MLS data output circuit 130 includes an RAM that stores the display data for dot matrix display received from outside by the interface 170, and an MLS decoder that decodes the display data into MLS data for MLS driving.

The segment data register 140 outputs segment data DSEGA1 to DSEGAn and DESGB1 to DSEGBm for segment display. The segment data register 140 is a register that stores segment data received from the outside by the interface 170.

The first selector 151 selects and outputs the MLS data DMLSA1 to DMLSAn when the select signal SDOT1 instructing the dot matrix display is input, and selects and outputs the segment data DSEGA1 to DSEGAn when the select signal SDOT1 instructing the segment display is input. The second selector 152 selects and outputs the MLS data DMLSB1 to DMLSBm when the select signal SDOT2 instructing the dot matrix display is input, and selects and outputs the segment data DSEGB1 to DSEGBm when the select signal SDOT2 instructing the segment display is input.

To the voltage supply circuit 110, a power supply voltage VDD is supplied from the outside of the integrated circuit device 100 via the power supply terminal TVDD, and a ground voltage VSS is supplied via the ground terminal TVSS. The voltage supply circuit 110 supplies a common voltage VC, a first positive polarity voltage V1 higher than the common voltage VC, a second positive polarity voltage V2 higher than the first positive polarity voltage V1, a first negative polarity voltage MV1 lower than the common voltage VC, and a second negative polarity voltage MV2 lower than the first negative polarity voltage MV1 to the drive circuit 120. The voltage supply circuit 110 supplies the common voltage VC, a third positive polarity voltage V3 higher than the second positive polarity voltage V2, and a third negative polarity voltage MV3 lower than the second negative polarity voltage MV2 to the first common drive circuit 181. Further, the voltage supply circuit 110 supplies the common voltage VC, the second positive polarity voltage V2, and the second negative polarity voltage MV2 to the second common drive circuit 182. Values of these voltages are of course adjusted to specifications of the liquid crystal display device to be driven, and are appropriately set depending on whether the driving method is the MLS method or the AP method.

The positive polarity and the negative polarity refer to polarity with reference to the common voltage VC, and are not polarity with reference to the ground voltage VSS. That is, when the common voltage VC is higher than the ground voltage VSS, the negative polarity voltage may be higher than the ground voltage VSS. Examples of the positive polarity voltage and the negative polarity voltage will be described later with reference to FIG. 5.

The drive circuit 120 outputs the first drive waveform signal for dot matrix display to the first output terminal group TAG when the first selector 151 selects the MLS data DMLSA1 to DMLSAn, and outputs the second drive waveform signal for segment display to the first output terminal group TAG when the first selector 151 selects the segment data DSEGA1 to DSEGAn. Further, the drive circuit 120 outputs the first drive waveform signal for dot matrix display to the second output terminal group TBG when the second selector 152 selects the MLS data DMLSB1 to DMLSBm, and outputs the second drive waveform signal for segment display to the second output terminal group TBG when the second selector 152 selects the segment data DSEGB1 to DSEGBm. Specifically, the first output terminal group TAG includes output terminals TA1 to TAn, and the second output terminal group TBG includes output terminals TB1 to TBm. The drive circuit 120 includes drive units DA1 to DAn corresponding to the output terminals TA1 to TAn and drive units DB1 to DBm corresponding to the output terminals TB1 to TBm.

Assuming that i is an integer of 1 or more and n or less, the drive unit DAi is taken as an example. The drive units DB1 to DBm have the same configuration and operation. The first selector 151 outputs the MLS data DMLSAi or the segment data DSEGAi to the drive unit DAi. The MLS data DMLSAi is data instructing selection of any one of the V1, the V2, the VC, the MV1, and the MV2. The segment data DSEGAi is data instructing selection of any one of the V1 and the MV1. When the MLS data DMLSAi is input, the drive unit DAi selects any one of the V1, the V2, the VC, the MV1, and the MV2 based on an instruction of the MLS data DMLSAi, and outputs the selected one to the output terminal TAi. When the segment data DSEGAi is input, the drive unit DAi selects any one of the V1 and the MV1 based on an instruction of the segment data DSEGAi and outputs the selected one to the output terminal TAi.

The first common drive circuit 181 outputs a first common drive waveform signal for dot matrix display to the first common terminal group TCMD. Specifically, the first common terminal group TCMD includes a plurality of common terminals, and the first common drive circuit 181 includes a plurality of common drive units. One common drive unit is provided corresponding to one common terminal. The control circuit 160 outputs common drive data for dot matrix display to the common drive units. The common drive data for dot matrix display is data instructing selection of any one of the V3, the VC, and the MV3. The first common drive circuit 181 outputs any one of the V3, the VC, and the MV3 to the common terminals based on the instruction of the common drive data.

The second common drive circuit 182 outputs a second common drive waveform signal for segment display to the second common terminal group TCMS. Specifically, the second common terminal group TCMS includes a plurality of common terminals, and the second common drive circuit 182 includes a plurality of common drive units. One common drive unit is provided corresponding to one common terminal. The control circuit 160 outputs common drive data for segment display to the common drive units. The common drive data for segment display is data for instructing selection of any one of the V2, the VC, and the MV2. The second common drive circuit 182 outputs any one of the V2, the VC, and the MV2 to the common terminals based on the instruction of the common drive data.

The first common terminal group TCMD is coupled to the row electrodes provided at the dot matrix display unit 210 of the liquid crystal display panel 200. The second common terminal group TCMS is coupled to the common electrodes provided at the segment display unit 220 of the liquid crystal display panel 200. The first output terminal group TAG is coupled to the column electrodes provided at the dot matrix display unit 210 or the segment electrodes provided at the segment display unit 220. In a configuration in which the first output terminal group TAG is coupled to the column electrodes provided at the dot matrix display unit 210, the first output terminal group TAG is set as an output terminal for dot matrix display. In a configuration in which the first output terminal group TAG is coupled to the segment electrodes provided at the segment display unit 220, the first output terminal group TAG is set as an output terminal for segment display. The second output terminal group TBG is also set in the same manner.

The integrated circuit device 100 according to the present embodiment described above includes the voltage supply circuit 110 and the drive circuit 120. The voltage supply circuit 110 supplies the common voltage VC, the first positive polarity voltage V1 higher than the common voltage VC, the second positive polarity voltage V2 higher than the first positive polarity voltage V1, the first negative polarity voltage MV1 lower than the common voltage VC, and the second negative polarity voltage MV2 lower than the first negative polarity voltage MV1. The drive circuit 120 outputs the first drive waveform signal for dot matrix display based on the common voltage VC, the first positive polarity voltage V1, the second positive polarity voltage V2, the first negative polarity voltage MV1, and the second negative polarity voltage MV2, and outputs the second drive waveform signal for segment display based on the common voltage VC, the first positive polarity voltage V1, and the first negative polarity voltage MV1.

According to the present embodiment, the voltage supply circuit 110 generates a plurality of voltages centered on the common voltage VC, and the drive circuit 120 generates the drive waveform signal for dot matrix display and the drive waveform signal for segment display using the plurality of voltages. Accordingly, in any one of the dot matrix display and the segment display, a drive waveform signal centered on the common voltage VC is generated, and thus burn-in of the liquid crystal display panel 200 due to a difference in center voltages would not occur. Further, since the voltage supply circuit 110 and the drive circuit 120 can be shared by the dot matrix display and the segment display, the circuit can be simplified and the cost can be reduced.

Further, the integrated circuit device 100 according to the present embodiment includes output terminals. The output terminals may be any of the output terminals TA1 to TAn and TB1 to TBm in FIG. 2. The drive circuit 120 outputs the first drive waveform signal to the output terminal based on the common voltage VC, the first positive polarity voltage V1, the second positive polarity voltage V2, the first negative polarity voltage MV1, and the second negative polarity voltage MV2 when the output terminal is set as the output terminal for dot matrix display. The drive circuit 120 outputs the second drive waveform signal to the output terminal based on the common voltage VC, the first positive polarity voltage V1, and the first negative polarity voltage MV1 when the output terminal is set as the output terminal for segment display.

According to the present embodiment, one output terminal can be used as the output terminal for dot matrix display or the output terminal for segment display. That is, according to the configuration of the liquid crystal display panel 200, it is possible to select whether the output terminal is set for the dot matrix display or the segment display. Further, the drive circuit 120 can be a circuit that selects any one of the first positive polarity voltage V1, the second positive polarity voltage V2, the first negative polarity voltage MV1, and the second negative polarity voltage MV2. In FIG. 2, the circuit corresponds to the drive units DA1 to DAn and DB1 to DBm. Accordingly, it is not necessary to separately provide a drive circuit for dot matrix display or a drive circuit for segment display, and the circuit configuration can be simplified. A detailed configuration of the drive units will be described later.

The integrated circuit device 100 according to the present embodiment further includes the control circuit 160. The control circuit 160 sets an output terminal as the output terminal for dot matrix display or the output terminal for segment display.

In this way, the control circuit 160 can set an output terminal as the output terminal for the dot matrix display or the output terminal for the segment display based on the setting information stored in the storage circuit 161.

2. Voltage Supply Circuit

Figure 3:
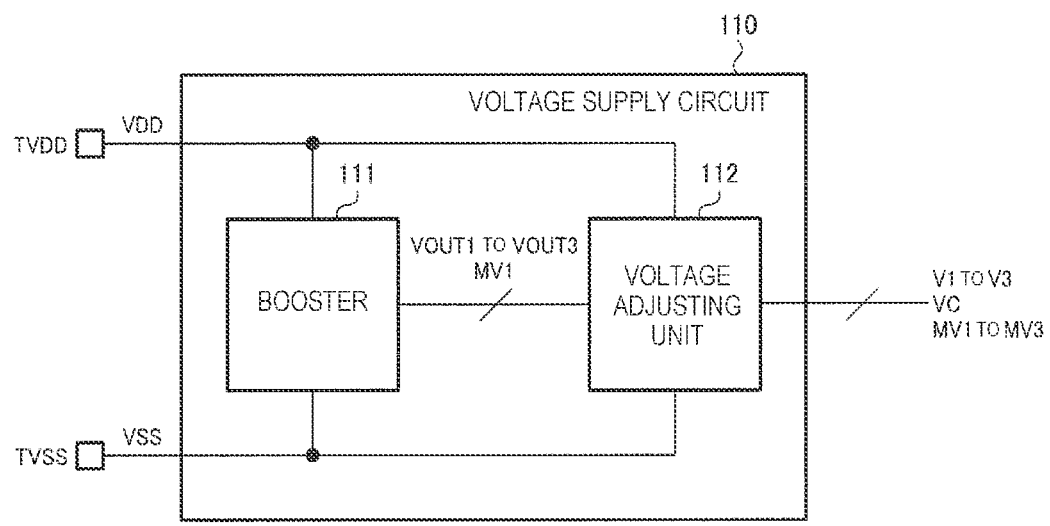
FIG. 3 is a configuration example of a voltage supply circuit.

FIG. 3 is a configuration example of the voltage supply circuit 110. The voltage supply circuit 110 includes a booster 111 and a voltage adjusting unit 112.

The booster 111 generates voltages VOUT1 to VOUT3 and the first negative polarity voltage MV1 from the power supply voltage VDD and the ground voltage VSS using a booster circuit and a regulator. The voltage adjusting unit 112 generates the first positive polarity voltage V1, the second positive polarity voltage V2, the third positive polarity voltage V3, the common voltage VC, the second negative polarity voltage MV2, and the third negative polarity voltage MV3 by using the voltages VOUT1 to VOUT3, the first negative polarity voltage MV1, the power supply voltage VDD, and the ground voltage VSS. Further, the voltage adjusting unit 112 can adjust V3−VC=VC−MV3=Vy and V2−V1=V1−VC=VC−MV1=MV1−MV2=Vs. The voltage adjusting unit 112 adjusts the voltages Vy and Vs to adjust a contrast of the dot matrix display and a contrast of the segment display. This will be described later with reference to FIG. 5.

Figure 4:
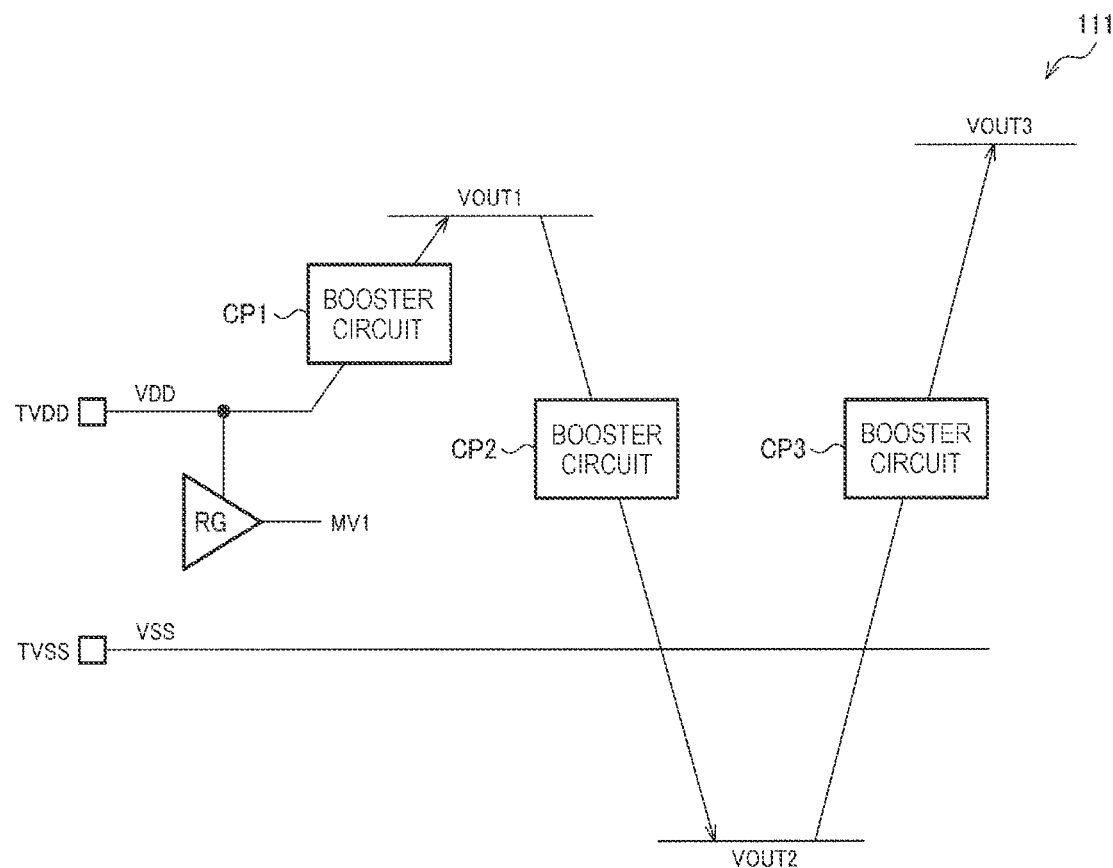
FIG. 4 is a detailed configuration example of a booster.

FIG. 4 is a detailed configuration example of the booster 111. The booster 111 includes a regulator RG and booster circuits CP1 to CP3.

The regulator RG generates the first negative polarity voltage MV1 by stepping down the power supply voltage VDD. The first negative polarity voltage MV1 is a voltage between the ground voltage VSS and the power supply voltage VDD. The regulator RG is, for example, a linear regulator including an operational amplifier and a resistor.

The booster circuit CP1 generates the voltage VOUT1 higher than the power supply voltage VDD by boosting the power supply voltage VDD. The booster circuit CP2 generates the voltage VOUT2 lower than the ground voltage VSS by inverting and boosting the voltage VOUT1 with reference to the ground voltage VSS. The booster circuit CP3 generates the voltage VOUT3 higher than the voltage VOUT1 by inverting and boosting the voltage VOUT2 with reference to the ground voltage VSS. The booster circuits CP1 to CP3 are switching regulators, and are, for example, charge pump circuits each including a capacitor and a switch.

The configuration of the booster 111 is not limited to that shown in FIG. 4. For example, the booster circuit CP3 may generate the voltage VOUT3 by inverting and boosting the third negative polarity voltage MV3 generated by the voltage adjusting unit 112 with reference to the ground voltage VSS. Alternatively, the booster 111 may include a regulator that steps down the voltage VOUT1, and the booster circuit CP2 may generate the voltage VOUT2 by inverting and stepping up a voltage generated by the regulator with reference to the ground voltage VSS.

Figure 5:
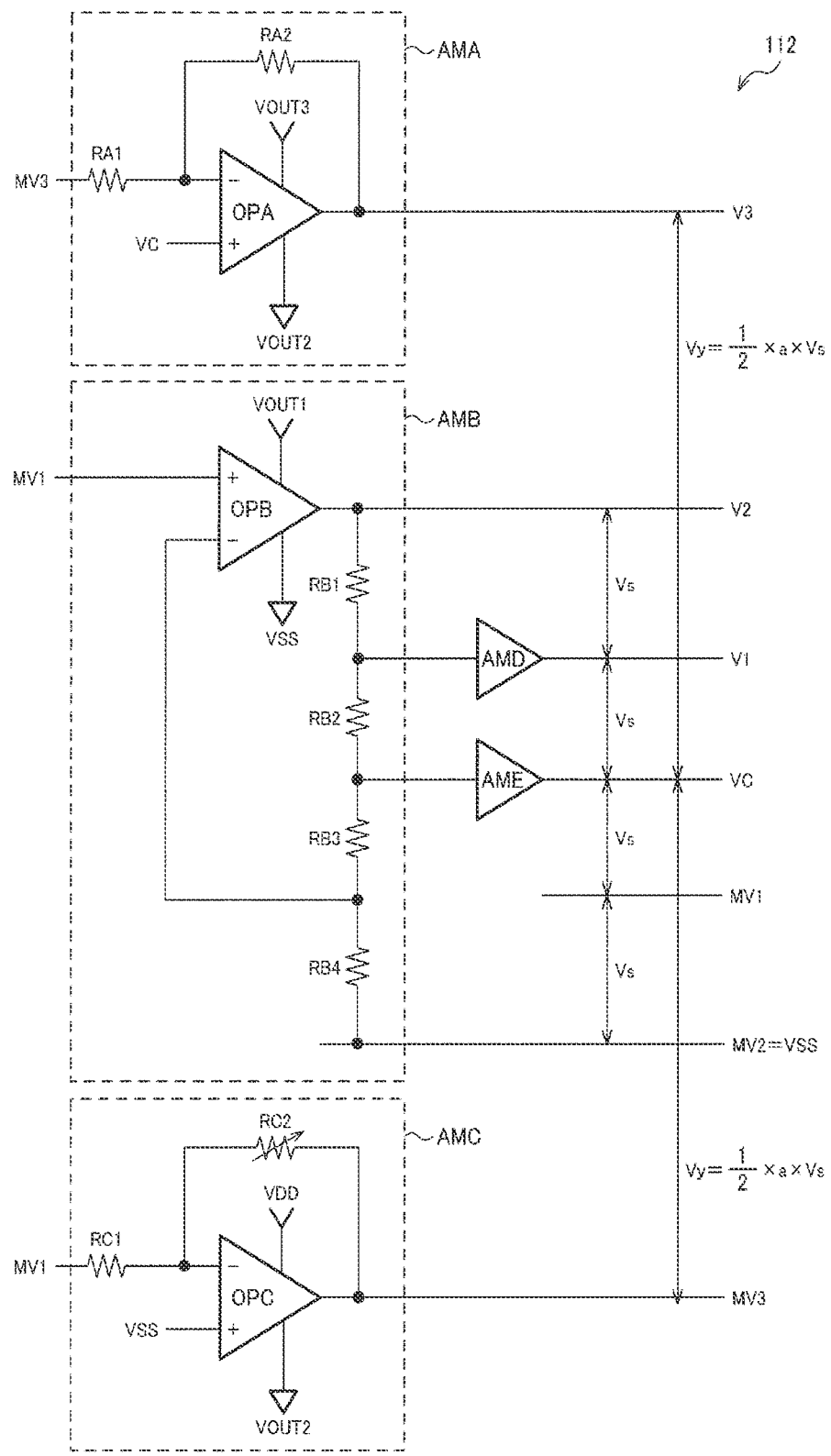
FIG. 5 is a detailed configuration example of a voltage adjusting unit.

FIG. 5 is a detailed configuration example of the voltage adjusting unit 112. The voltage adjusting unit 112 includes an amplifier circuit AMA that is an inverting amplifier circuit, an amplifier circuit AMB that is a non-inverting amplifier circuit, an amplifier circuit AMC that is an inverting amplifier circuit having an electronic volume function, and amplifier circuits AMD and AME that are voltage follower circuits.

The amplifier circuit AMC includes an operational amplifier OPC configured as the inverting amplifier circuit and resistors RC1 and RC2. The operational amplifier OPC operates using the power supply voltage VDD and the voltage VOUT2 as power supplies. The amplifier circuit AMC generates the third negative polarity voltage MV3 by inverting and amplifying the first negative polarity voltage MV1 with reference to the ground voltage VSS. The resistor RC2 is a variable resistor circuit whose resistance value is variably adjusted. By adjusting the resistance value of the resistor RC2, a resistance ratio of the resistor RC1 to the resistor RC2, that is, a gain of the amplifier circuit AMC is adjusted. The gain is stored in the storage circuit 161 of the control circuit 160. For example, when the storage circuit 161 is a nonvolatile memory, the gain may be stored in the nonvolatile memory in advance, or when the storage circuit 161 is the RAM or the register, the gain may be set in an RAM or a register from the external processing device via the interface 170. By adjusting the resistance value of the resistor RC2, the third negative polarity voltage MV3 is adjusted.

The amplifier circuit AMA includes an operational amplifier OPA configured as the inverting amplifier circuit and resistors RA1 and RA2. The operational amplifier OPA operates using the voltages VOUT3 and VOUT2 as the power supplies. The amplifier circuit AMA generates the third positive polarity voltage V3 by inverting and amplifying the third negative polarity voltage MV3 with reference to the common voltage VC. A gain of the amplifier circuit AMA is −1. Since the third positive polarity voltage V3 changes in conjunction with the third negative polarity voltage MV3, V3−VC=VC−MV3.

When MV1−VSS=Vs and the gain of the amplifier circuit AMC is −(a/2−2), MV3=−(a/2−2)×Vs+VSS. Here, a is a ratio of Vy to Vs described above. As will be described later, since VC−MV1=MV1−VSS=Vs, VC−MV3=−(a/2)×Vs. When this is denoted by Vy, the V3 is a voltage obtained by inverting and amplifying MV3 with reference to the common voltage VC, and thus V3−VC=VC−MV3=Vy. Since a is adjusted by adjusting the gain of the amplifier circuit AMC, V3−VC=VC−MV3=Vy is adjusted.

The amplifier circuit AMB includes an operational amplifier OPB configured as the non-inverting amplifier circuit and resistors RB1 to RB4. The resistors RB1 to RB4 are coupled in series between an output node of the operational amplifier OPB and a node of the ground voltage VSS, and a node between the resistors RB3 and RB4 is coupled to an inverting input node of the operational amplifier OPB. The amplifier circuit AMB generates the second positive polarity voltage V2 by amplifying the first negative polarity voltage MV1 in a forward direction with reference to the ground voltage VSS. Resistance values of the resistors RB1 to RB4 are the same, and a gain of the amplifier circuit AMB is 4.

The amplifier circuit AMD buffers a voltage between the resistor RB1 and the resistor RB2 with a gain of 1 to output the first positive polarity voltage V1. The amplifier circuit AME buffers a voltage between the resistor RB2 and the resistor RB3 with the gain of 1 to output the common voltage VC.

VSS=MV2 and MV1−VSS=Vs. Since the amplifier circuit AMB amplifies Vs with the gain of 4, V2−MV2=4×Vs. Since the resistance values of the resistors RB1 to RB4 are the same and the gains of the amplifier circuits AMD and AME are 1, V2−V1=V1−VC=VC−MV1=MV1−MV2=Vs. The regulator RG of the booster 111 has the electronic volume function and can adjust the first negative polarity voltage MV1. By adjusting the first negative polarity voltage MV1, Vs is adjusted, and the V2, the V1, the VC, and the MV1 are adjusted. An electronic volume value of the regulator RG is stored in the storage circuit 161 of the control circuit 160. For example, when the storage circuit 161 is a nonvolatile memory, the electronic volume value may be stored in the nonvolatile memory in advance, or when the storage circuit 161 is an RAM or a register, the electronic volume value may be set in the RAM or the register from the external processing device via the interface 170.

An effective voltage applied to each dot of the dot matrix display unit 210 is expressed by the following equations (1) and (2) using a and Vs described above. Von_duty is an effective voltage when the dot is on, and Voff_duty is an effective voltage when the dot is off. N is the number of lines of the low electrodes.

$$V\text{on\_duty}=Vs\times\{(a^2+2a+N)/N\}^{1/2} \quad (1)$$

$$V\text{off\_duty}=Vs\times\{(a^2-2a+N)/N\}^{1/2} \quad (2)$$

As shown in the equations (1) and (2) described above, the effective voltage in the dot matrix display can be adjusted by a and Vs. On the other hand, in the segment display, since driving is performed using the V2, the V1, the VC, the MV1, and the MV2, the effective voltage is adjusted by Vs. Therefore, by fixing Vs and adjusting a, only the contrast of the dot matrix display can be adjusted. For example, it is possible to make the contrast of the dot matrix display and the contrast of the segment display as close as possible. In addition, by adjusting Vs, it is possible to adjust the contrasts of both the dot matrix display and the segment display, and it is possible to implement an optimum contrast.

The voltage supply circuit 110 according to the present embodiment described above includes a first regulator that generates the first negative polarity voltage MV1 based on the power supply voltage VDD. In FIG. 4, the regulator RG corresponds to the first regulator. The first regulator is an electronic volume that performs contrast adjustment of segment display.

As described above, by the electronic volume function of the regulator RG that is the first regulator, MV1−MV2=Vs can be adjusted, and by adjusting the Vs, the contrast of the segment display is adjusted.

Further, in the present embodiment, the voltage supply circuit 110 includes a second regulator. In FIG. 5, the amplifier circuits AMB, AMD, and AME correspond to the second regulator. The second regulator generates the second positive polarity voltage V2, which is a voltage obtained by multiplying the first negative polarity voltage MV1 by four with reference to the second negative polarity voltage MV2. The second regulator generates the first positive polarity voltage V1 and the common voltage VC that divide a voltage between the first negative polarity voltage MV1 and the second positive polarity voltage V2 into three equal parts.

In this way, the second positive polarity voltage V2, the first positive polarity voltage V1, the common voltage VC, the first negative polarity voltage MV1, and the second negative polarity voltage MV2 are equally spaced at the interval Vs. Since the segment display is performed using the five voltages, the contrast of the segment display is adjusted by adjusting the interval Vs by the electronic volume of the regulator RG.

Further, in the present embodiment, the voltage supply circuit 110 includes a third regulator. In FIG. 5, the amplifier circuits AMA and AMC correspond to the third regulator. The third regulator generates the third positive polarity voltage V3 higher than the second positive polarity voltage V2 and the third negative polarity voltage MV3 lower than the second negative polarity voltage MV2, and supplies the third positive polarity voltage V3 and the third negative polarity voltage MV3 to a common drive circuit for dot matrix display. In FIG. 2, the first common drive circuit 181 corresponds to the common drive circuit for dot matrix display. The third regulator is an electronic volume that performs contrast adjustment for dot matrix display.

As described above, the interval Vy between the third positive polarity voltage V3, the common voltage VC, and the third negative polarity voltage MV3 is adjusted by the electronic volume function of the amplifier circuit AMC included in the third regulator. Since the common drive waveform signal for dot matrix display is generated using these three voltages, the contrast of the dot matrix display is adjusted by adjusting the interval Vy.

In FIG. 5, the amplifier circuit AMC has the electronic volume function, but the configuration of the third regulator is not limited thereto. For example, the third positive polarity voltage V3 may be adjusted by the electronic volume, and the third negative polarity voltage MV3 may be generated by inverting and amplifying the third positive polarity voltage V3. The value of each voltage generated as described above is of course adjusted to the specification of the liquid crystal display device to be driven, and is appropriately set depending on whether the driving method is the MLS method or the AP method.

3. Selector, Drive Circuit, and Common Drive Circuit

Figure 6:
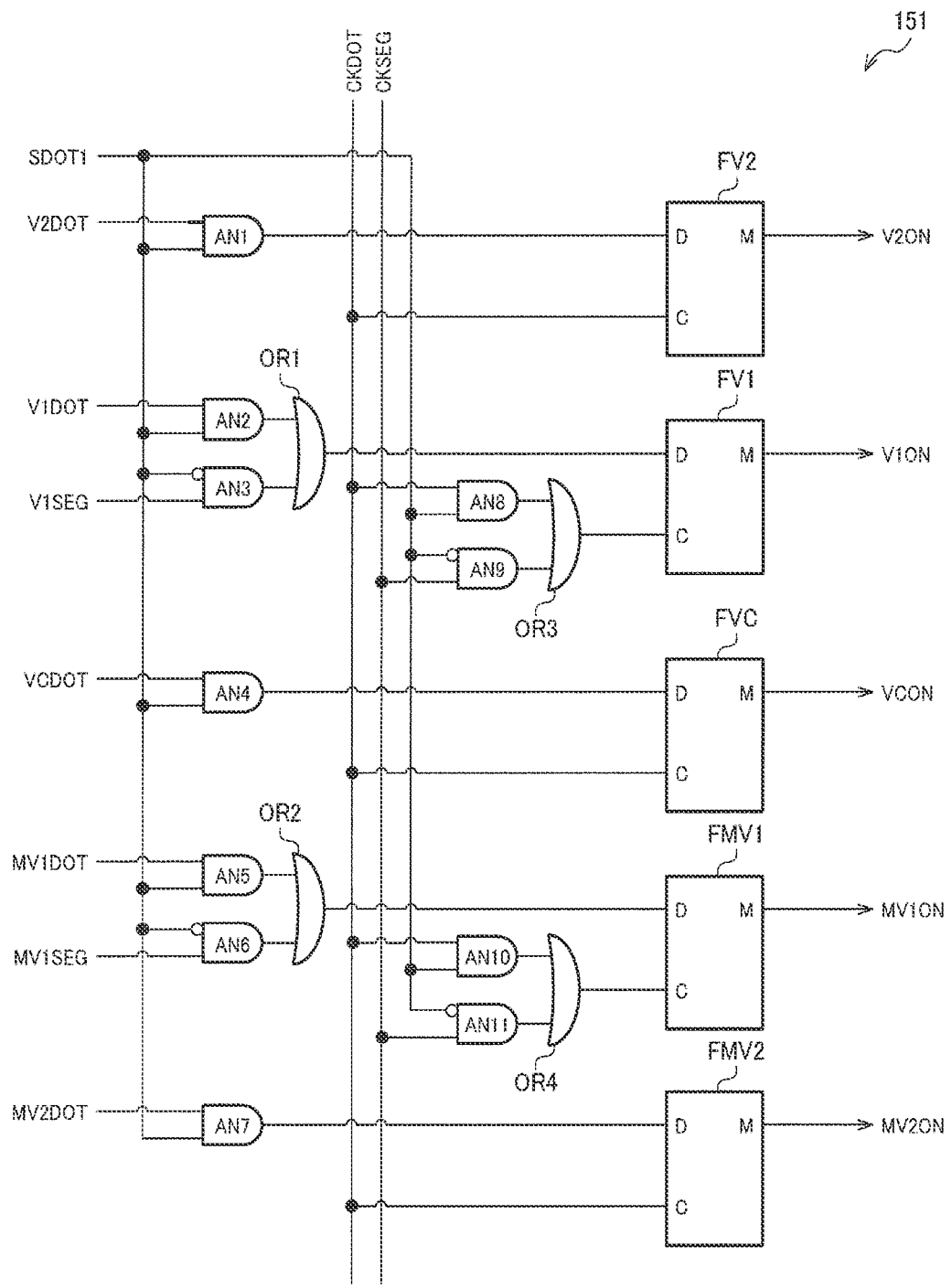
FIG. 6 is a detailed configuration example of a selector.

FIG. 6 is a detailed configuration example of the first selector 151. The first selector 151 includes AND circuits AN1 to AN11, OR circuits OR1 to OR4, and latch circuits FV2, FV1, FVC, FMV1, and FMV2. Here, a configuration for one drive unit is shown, and a configuration similar to that of FIG. 6 is provided corresponding to each drive unit of the drive units DA1 to DAn. Although FIG. 6 shows the first selector 151 as an example, the second selector 152 has the same configuration.

To the first selector 151, signals V2DOT, V1DOT, VCDOT, MV1DOT, and MV2DOT are input as the MLS data, and signals V1SEG and MV1SEG are input as the segment data. Here, the MLS data is DMLSA1 to DMLSAn in FIG. 2 described above, and the segment data is DSEGA1 to DSEGAn.

The AND circuits AN1 to AN7 and the OR circuits OR1 and OR2 function as a signal selector. When the select signal SDOT1 is at a high level, the signal selector selects the signals V2DOT, V1DOT, VCDOT, MV1DOT, and MV2DOT and outputs the signals to the latch circuits FV2, FV1, FVC, FMV1, and FMV2. When the select signal SDOT1 is at a low level, the signal selector selects the signals V1SEG and MV1SEG and outputs the signals to the latch circuits FV1 and FMV1, and outputs the low level to the latch circuits FV2, FVC, and FMV2.

The AND circuits AN8 to AN11 and the OR circuits OR3 and OR4 function as a clock selector. When the select signal SDOT1 is at the high level, the clock selector selects a clock signal CKDOT for dot matrix display and outputs the clock signal to the latch circuits FV1 and FMV1. When the select signal SDOT1 is at the low level, the clock selector selects a clock signal CKSEG for segment display and outputs the clock signal to the latch circuits FV1 and FMV1. The clock signal CKDOT is input to the latch circuits FV2, FVC, and FMV2. The clock signals CKDOT and CKSEG are input from the control circuit 160 to the first selector 151.

When the select signal SDOT1 is at the high level, the latch circuits FV2, FV1, FVC, FMV1, and FMV2 latch the signals V2DOT, V1DOT, VCDOT, MV1DOT, and MV2DOT by the clock signal CKDOT and output latched signals as signals V2ON, V1ON, VCON, MV1ON, and MV2ON. That is, when the select signal SDOT1 is at the high level, the first selector 151 selects and outputs the MLS data for dot matrix display. When the select signal SDOT1 is at the low level, the latch circuits FV1 and FMV1 latch the signals V1SEG and MV1SEG by the clock signal CKSEG and output latched signals as signals V1ON and MV1ON.

That is, when the select signal SDOT1 is at the low level, the first selector 151 selects and outputs the segment data for segment display. At this time, since the latch circuits FV2, FVC, and FMV2 latch the low level, the signals V2ON, VCON, and MV2ON are at the low level.

Figure 7:
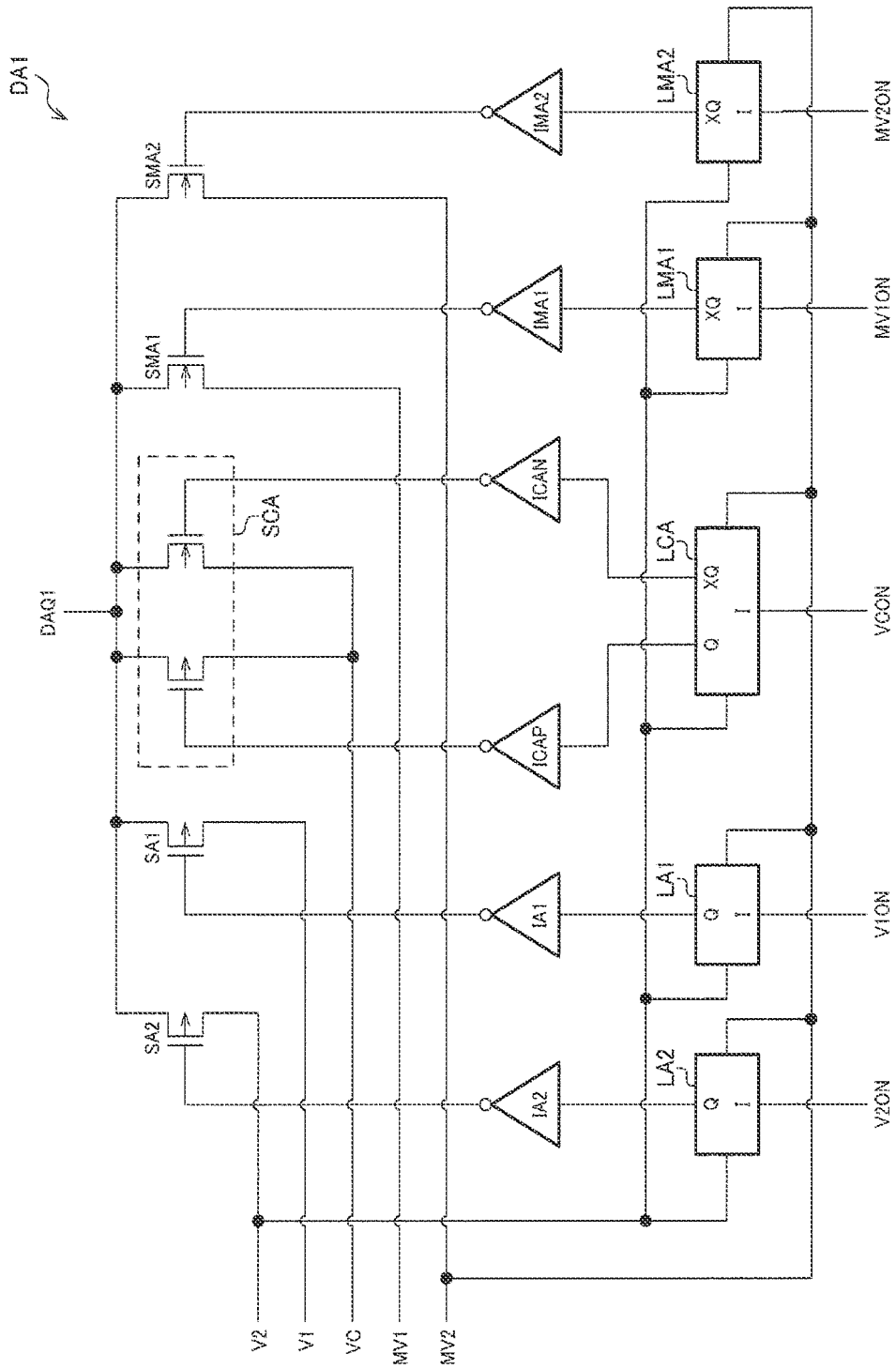
FIG. 7 is a detailed configuration example of a drive unit.

FIG. 7 is a detailed configuration example of the drive unit DA1. The drive unit DA1 includes level shifters LA2, LA1, LCA, LMA1, and LMA2, inverters IA2, IA1, ICAP, ICAN, IMA1, and IMA2, and switches SA2, SA1, SCA, SMA1, and SMA2. Here, the drive unit DA1 will be described as an example, and the drive units DA2 to DAn and DB1 to DBm have the same configuration.

The level shifters LA2, LA1, LCA, LMA1, and LMA2 level-shift the signals V2ON, V1ON, VCON, MV1ON, and MV2ON. After the level shift, the high level is the V2, and the low level is the MV2. "I" indicates an input, "Q" indicates a non-inverted output having the same logic level as the input, and "XQ" indicates an inverted output having a logic level obtained by inverting the input.

The inverters IA2, IA1, and ICAP logically invert non-inverted outputs of the level shifters LA2, LA1, and LCA, and output the inverted outputs to the switches SA2, SA1, and SCA. The inverters ICAN, IMA1, and IMA2 logically invert inverted outputs of the level shifters LCA, LMA1, and LMA2, and output the inverted outputs to the switches SCA, SMA1, and SMA2.

The switches SA2 and SA1 are P-type transistors. One of a source and a drain of the switch SA2 is coupled to an output node of the drive unit DA1, the second positive polarity voltage V2 is input to the other one of the source and the drain, and an output signal of the inverter IA2 is input to a gate. One of a source and a drain of the switch SA1 is coupled to the output node of the drive unit DA1, the first positive polarity voltage V1 is input to the other one of the source and the drain, and an output signal of the inverter IA1 is input to a gate.

The switch SCA is a transfer gate, and includes a P-type transistor and an N-type transistor coupled in parallel. One end of the transfer gate is coupled to the output node of the drive unit DA1, and the common voltage VC is input to the other end. An output signal of the inverter ICAP is input to a gate of the P-type transistor of the transfer gate, and an output signal of the inverter ICAN is input to a gate of the N-type transistor.

The switches SMA1 and SMA2 are N-type transistors. One of a source and a drain of the switch SMA1 is coupled to the output node of the drive unit DA1, the first negative polarity voltage MV1 is input to the other one of the source and the drain, and an output signal of the inverter IMA1 is input to a gate. One of a source and a drain of the switch SMA2 is coupled to the output node of the drive unit DA1, the second negative polarity voltage MV2 is input to the other one of the source and the drain, and an output signal of the inverter IMA2 is input to a gate.

Any one of the signals V2ON, V1ON, VCON, MV1ON, and MV2ON is at the high level, and the other signals are at the low level. For example, when the signal V2ON is at the high level, the switch SA2 is turned on, the switches SA1, SCA, SMA1, and SMA2 are turned off, and the drive unit DA1 outputs the second positive polarity voltage V2 as a drive waveform signal DAQ1. Similarly, when the signals V1ON, VCON, MV1ON, and MV2ON are at the high level, the switches SA1, SCA, SMA1, and SMA2 are turned on, and the drive unit DA1 outputs the V1, the VC, the MV1, and the MV2 as the drive waveform signal DAQ1.

Figure 8:
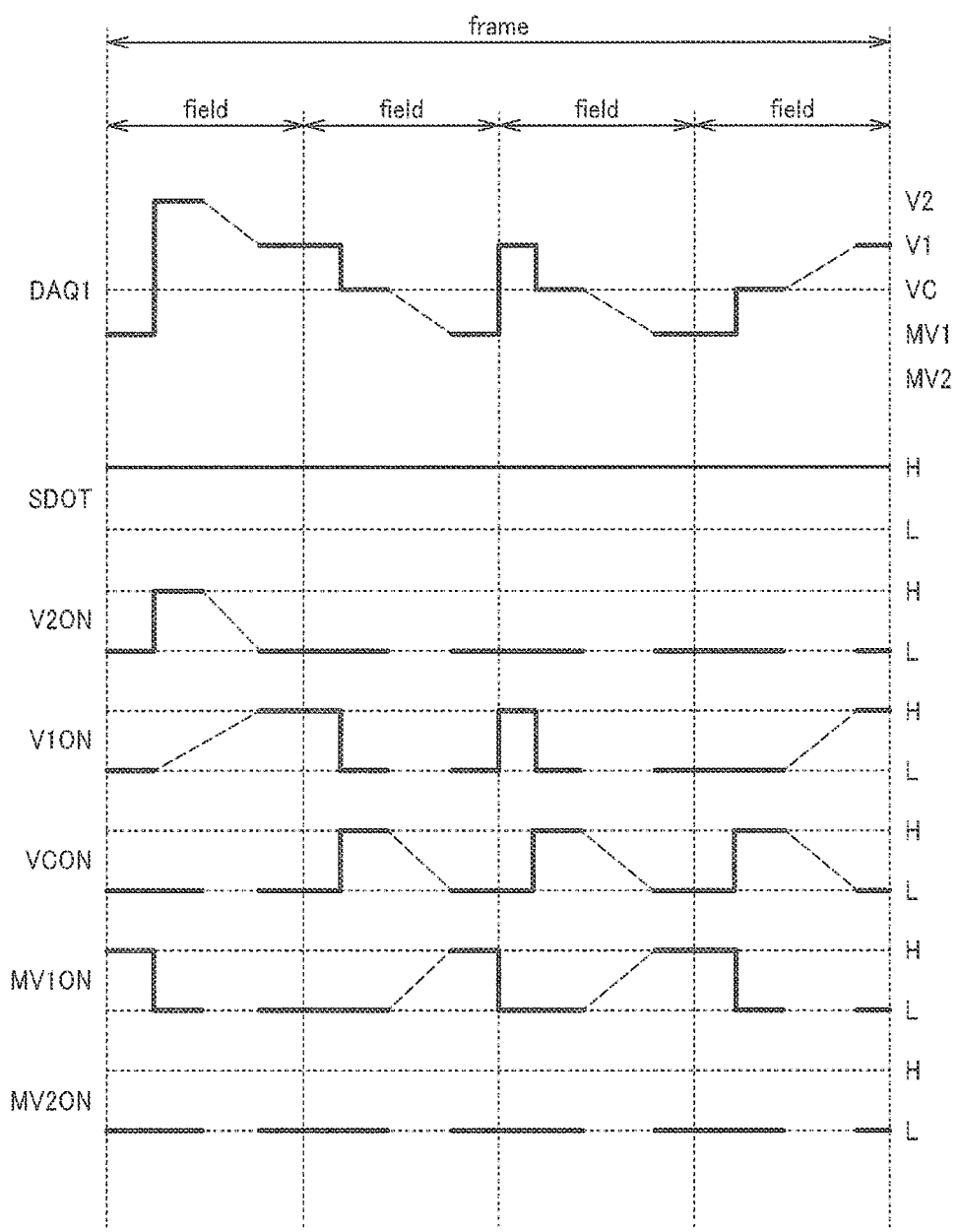
FIG. 8 is an example of a drive waveform signal for dot matrix display.

FIG. 8 is an example of the drive waveform signal DAQ1 for dot matrix display. Here, an example in which one frame includes four fields is shown. For example, in a case of 1/64 duty, the drive waveform signal DAQ1 of one field includes 16 voltages in time series, and only a first, a second, and a sixteenth voltages are shown in FIG. 8. Although illustration of the common drive waveform signal is omitted, a mechanism of an operation of the first common drive circuit 181 is the same as that of the drive circuit 120, and a configuration thereof will be described with reference to FIG. 10.

As shown in FIG. 8, when the select signal SDOT1 is at the high level, the first selector 151 selects the MLS data. At this time, any one of the signals V2ON, V1ON, VCON, MV1ON, and MV2ON is at the high level, and the drive unit DA1 outputs any one of the V2, the V1, the VC, the MV1, and the MV2. For example, in a first field, since the signals MV1ON, V2ON, . . . , and V1ON are at the high level in time series, the drive unit DA1 outputs the MV1, the V2, . . . , and the V1 as the drive waveform signal DAQ1 in time series. In this way, when the select signal SDOT1 is at the high level, the drive waveform signal DAQ1 becomes the drive waveform signal for dot matrix display.

Figure 9:
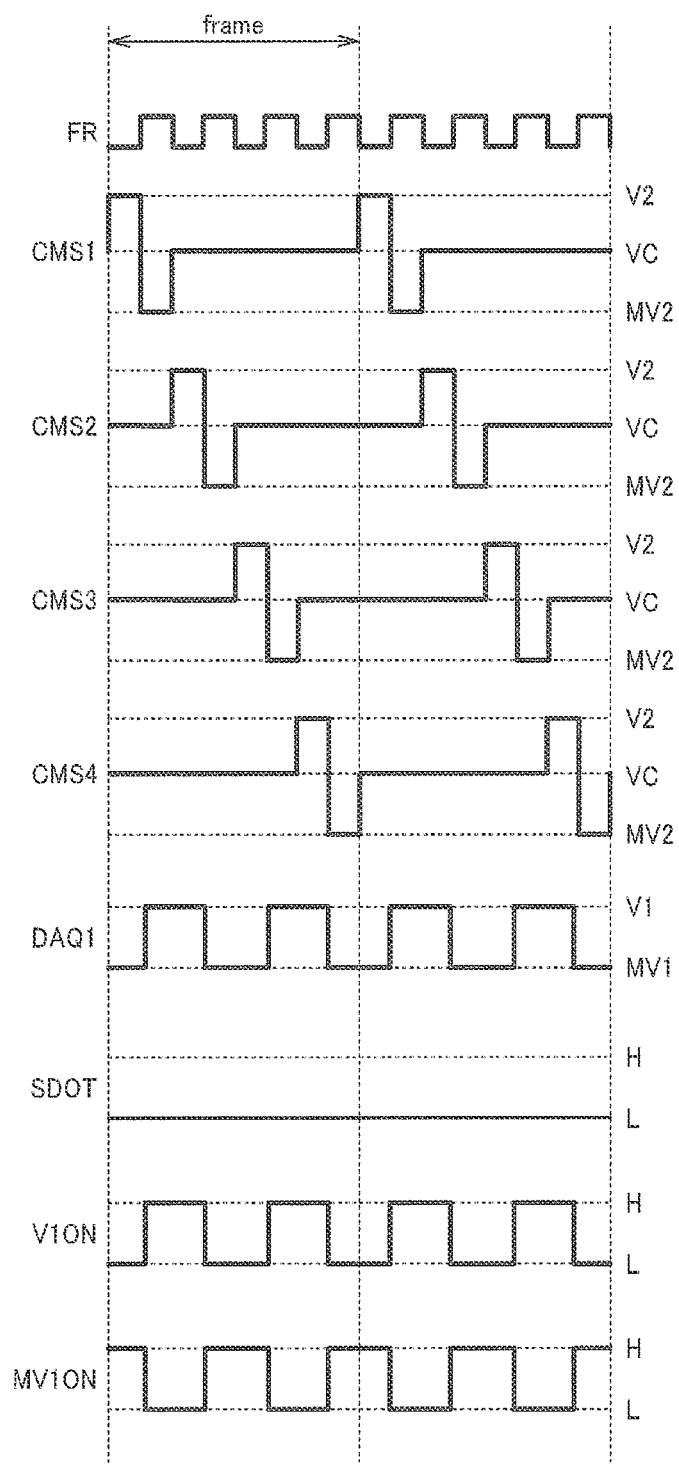
FIG. 9 is an example of a drive waveform signal for segment display.

FIG. 9 shows an example of the drive waveform signal DAQ1 for segment display. Here, an example of a waveform when there are four common electrodes is shown. CMS1 to CMS4 are common drive waveform signals for the four common electrodes.

A polarity signal FR is a signal for controlling a driving polarity. When the polarity signal FR is at the low level, negative polarity driving is performed, and when the polarity signal FR is at the high level, positive polarity driving is performed. In the one frame, the polarity signal FR repeats the low level and the high level for four cycles. In a first cycle, when the polarity signal FR is at the low level, the common drive waveform signal CMS1 is the V2, and when the polarity signal FR is at the high level, the common drive waveform signal CMS1 is the MV2, and the common drive waveform signals CMS2 to CMS4 are the VC. Similarly, in a second, a third, and a fourth cycles, when the polarity signal FR is at the low level, the common drive waveform signals CMS2, CMS3, and CMS4 are the V2, and when the polarity signal FR is at the high level, the common drive waveform signals CMS2, CMS3, and CMS4 are the MV2.

When the select signal SDOT1 is at the low level, the first selector 151 selects the segment data. At this time, any one of the signals V1ON and MV1ON is at the high level, and the drive unit DA1 outputs any one of the V1 and the MV1. In FIG. 9, in the first cycle of the polarity signal FR, the drive waveform signal DAQ1 is the MV1 when the polarity signal FR is at the low level, and the drive waveform signal DAQ1 is the V1 when the polarity signal FR is at the high level. Hereinafter, the drive waveform signal DAQ1 is the V1, the MV1, the MV1, the V1, the V1, and the MV1. In this way, when the select signal SDOT1 is at the low level, the drive waveform signal DAQ1 is the drive waveform signal for segment display. In a waveform example of FIG. 9, the liquid crystal is turned on in a portion where the common electrodes to which the common drive waveform signal CMS1 is applied and the segment electrodes to which the drive waveform signal DAQ1 is applied overlap. Similarly, in a portion where the common electrodes to which the common drive waveform signals CMS2, CMS3, and CMS4 are applied and the segment electrodes to which the drive waveform signal DAQ1 is applied overlap, the liquid crystal is turned off, turned on, and turned off.

Figure 10:
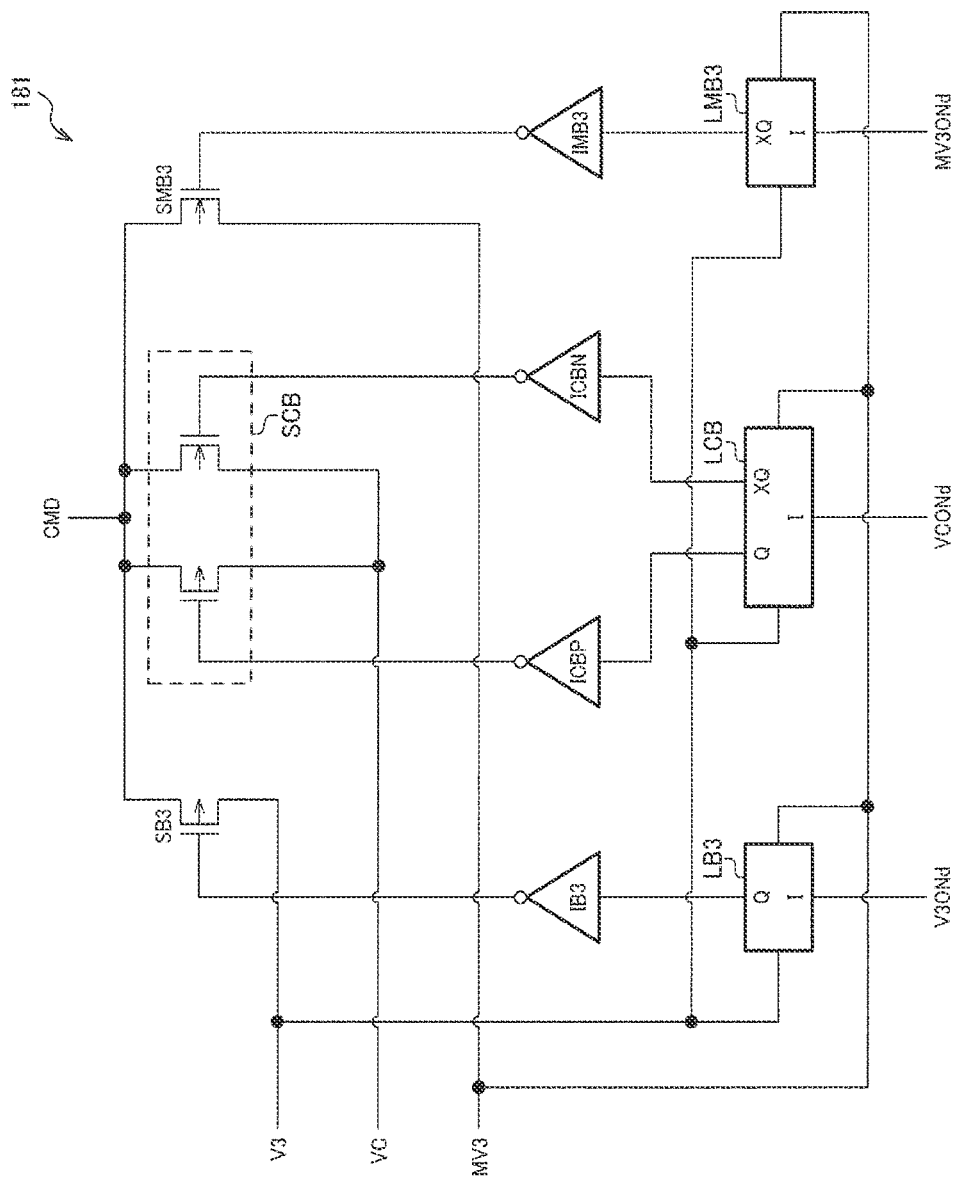
FIG. 10 is a detailed configuration example of a first common drive circuit.

FIG. 10 is a detailed configuration example of the first common drive circuit 181. The first common drive circuit 181 includes level shifters LB3, LCB, and LMB3, inverters IB3, ICBP, ICBN, and IMB3, and switches SB3, SCB, and SMB3. FIG. 10 shows the configuration of the common drive unit corresponding to one common terminal, and the same configuration is provided for each common terminal of the common terminal group TCMD.

The level shifters LB3, LCB, and LMB3 level-shift signals V3ONd, VCONd, and MV3ONd from the control circuit 160. After the level shift, the high level is the V3, and the low level is the MV3.

The inverters IB3 and ICBP logically invert non-inverted outputs of the level shifters LB3 and LCB and output the inverted outputs to the switches SB3 and SCB. The inverters ICBN and IMB3 logically invert inverted outputs of the level shifters LCB and LMB3, and output the inverted outputs to the switches SCB and SMB3.

The switch SB3 is a P-type transistor. One of a source and a drain of the switch SB3 is coupled to an output node of the common drive unit, the third positive polarity voltage V3 is input to the other one of the source and the drain, and an output signal of the inverter IB3 is input to a gate.

The switch SCB is a transfer gate, and includes a P-type transistor and an N-type transistor coupled in parallel. One end of the transfer gate is coupled to the output node of the common drive unit, and the common voltage VC is input to the other end. An output signal of the inverter ICBP is input to a gate of the P-type transistor of the transfer gate, and an output signal of the inverter ICBN is input to a gate of the N-type transistor.

The switch SMB3 is an N-type transistor. One of a source and a drain of the switch SMB3 is coupled to the output node of the common drive unit, the third negative polarity voltage MV3 is input to the other one of the source and the drain, and an output signal of the inverter IMB3 is input to a gate.

Any one of the signals V3ONd, VCONd, and MV3ONd is at the high level, and the other signals are at the low level. For example, when the signal V3ONd is at the high level, the switch SB3 is turned on, the switches SCB and SMB3 are turned off, and the common drive unit outputs the third positive polarity voltage V3 as a common drive waveform signal CMD. Similarly, when the signals VCONd and MV3ONd are at the high level, the switches SCB and SMB3 are turned on, and the common drive unit outputs the VC and the MV3 as the common drive waveform signal CMD.

Figure 11:
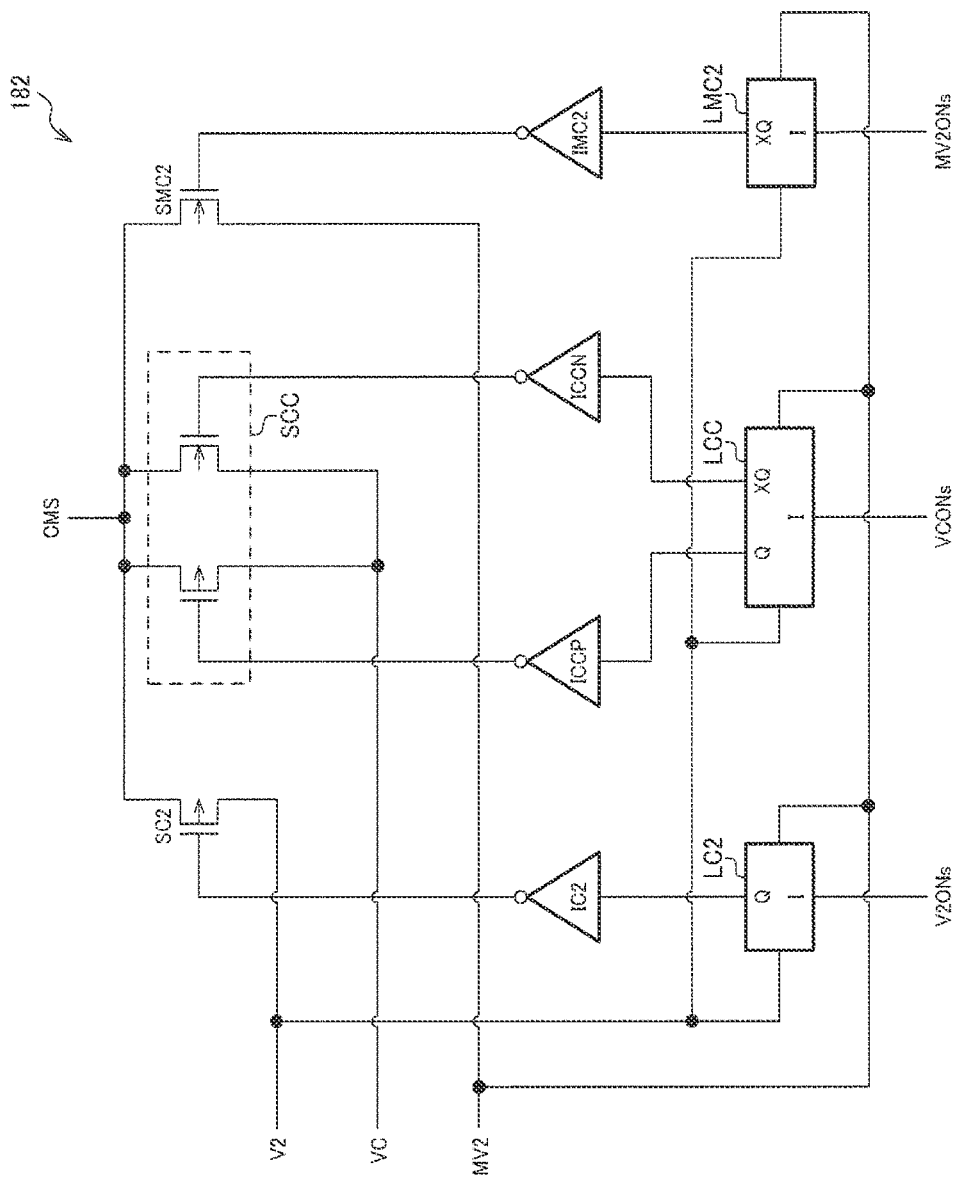
FIG. 11 is a detailed configuration example of a second common drive circuit.

FIG. 11 is a detailed configuration example of the second common drive circuit 182. The second common drive circuit 182 includes level shifters LC2, LCC, and LMC2, inverters IC2, ICCP, ICCN, and IMC2, and switches SC2, SCB, and SMC2. FIG. 11 shows the configuration of the common drive unit corresponding to one common terminal, and the same configuration is provided for each common terminal of the common terminal group TCMS. FIG. 11 shows a configuration example when duty driving is performed, and when both the duty driving and static driving are performed, a configuration similar to that of the drive unit DA1 may be used so that the voltages V2, V1, VC, MV1, and MV2 can be selected.

The level shifters LC2, LCB, and LMC2 level-shift signals V2ONs, VCONs, and MV2ONs from the control circuit 160. After the level shift, the high level is the V2, and the low level is the MV2.

The inverters IC2 and ICCP logically invert non-inverted outputs of the level shifters LC2 and LCC and output the inverted outputs to the switches SC2 and SCC. The inverters ICON and IMC2 logically invert inverted outputs of the level shifters LCC and LMC2, and output the inverted outputs to the switches SCC and SMC2.

The switch SC2 is a P-type transistor. One of a source and a drain of the switch SC2 is coupled to the output node of the common drive unit, the second positive polarity voltage V2 is input to the other one of the source and the drain, and an output signal of the inverter IC2 is input to a gate.

The switch SCC is a transfer gate, and includes a P-type transistor and an N-type transistor coupled in parallel. One end of the transfer gate is coupled to the output node of the common drive unit, and the common voltage VC is input to the other end. An output signal of the inverter ICCP is input to a gate of the P-type transistor of the transfer gate, and an output signal of the inverter ICCN is input to a gate of the N-type transistor.

The switch SMC2 is an N-type transistor. One of a source and a drain of the switch SMC2 is coupled to the output node of the common drive unit, the second negative polarity voltage MV2 is input to the other one of the source and the drain, and an output signal of the inverter IMC2 is input to a gate.

Any one of the signals V2ONs, VCONs, and MV2ONs is at the high level, and the other signals are at the low level. For example, when the signal V2ONs is at the high level, the switch SC2 is turned on, the switches SCC and SMC2 are turned off, and the common drive unit outputs the second positive polarity voltage V2 as a common drive waveform signal CMS. Similarly, when the signals VCONs and MV2ONs are at the high level, the switches SCC and SMC2 are turned on, and the common drive unit outputs the VC and the MV2 as the common drive waveform signal CMS.

4. Layout Example

Figure 12:
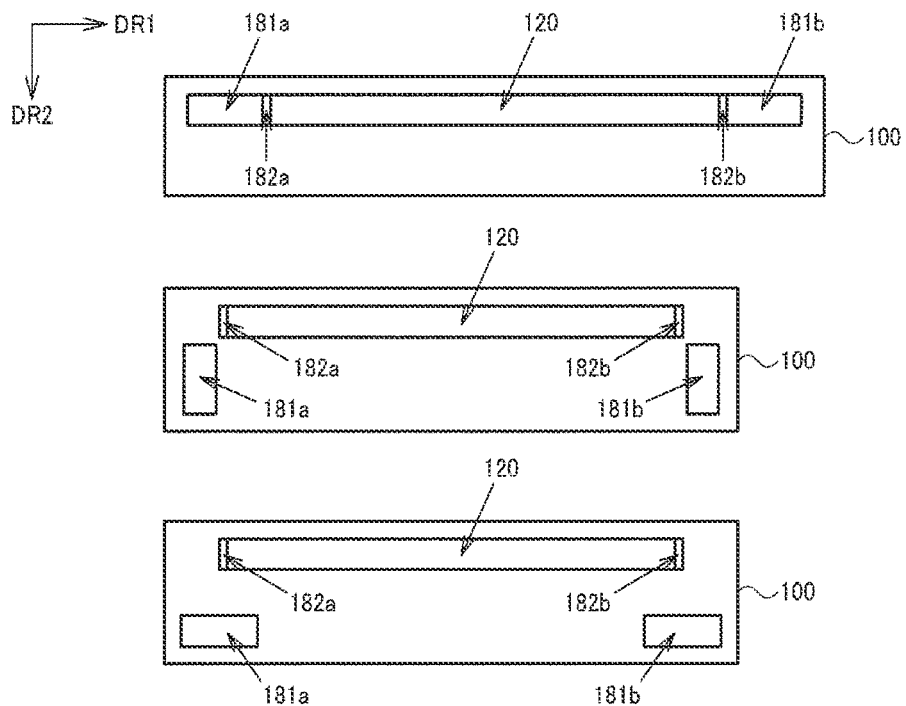
FIG. 12 is a plan view of a layout example of a drive circuit, the first common drive circuit, and the second common drive circuit.
Figure 13:
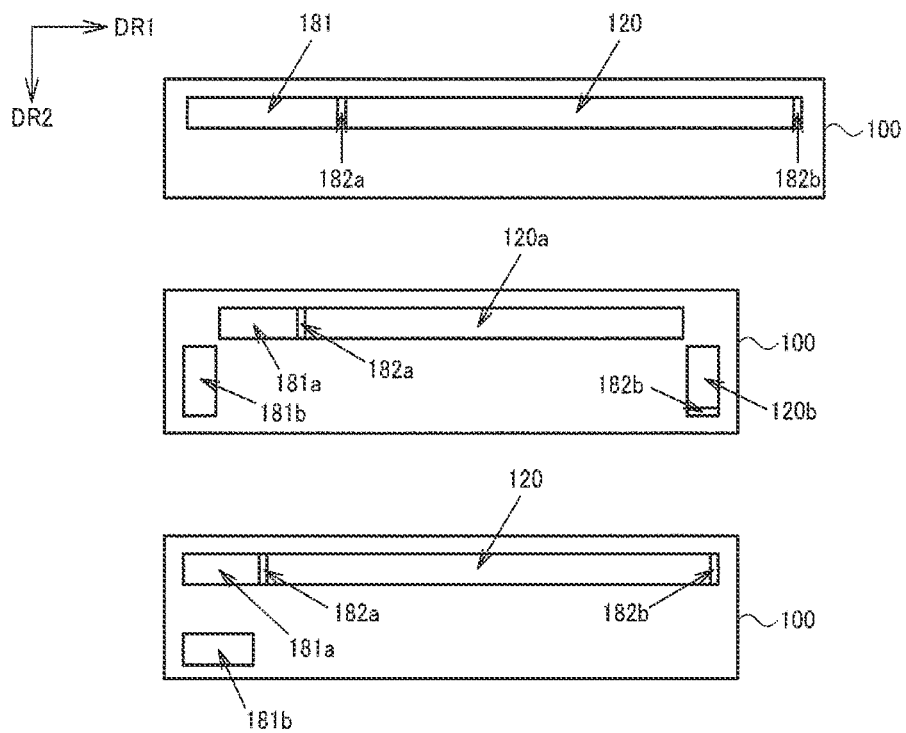
FIG. 13 is a plan view of a layout example of the drive circuit, the first common drive circuit, and the second common drive circuit.

FIGS. 12 and 13 are plan views of layout examples of the drive circuit 120, the first common drive circuit 181, and the second common drive circuit 182. In each of FIGS. 12 and 13, three layout examples are shown, and each layout example is independent. Further, the layout examples may be horizontally inverted or vertically inverted.

In a state in which the integrated circuit device 100 is mounted at the liquid crystal display panel 200 of FIG. 1, it is assumed that the long side of the integrated circuit device 100 is parallel to the first direction DR1 and the short side is parallel to the second direction DR2. The integrated circuit device 100 has a first short side, a second short side located opposite to the first short side on the first direction DR1 side, a first long side, and a second long side located opposite to the first long side on the second direction DR2 side. In a state in which the integrated circuit device 100 is not mounted at the liquid crystal display panel 200, the long side direction and the short side direction may have no relation to the first direction DR1 and the second direction DR2. In this case, in the following description, the first direction DR1 may be read as the long side direction, and the second direction DR2 may be read as the short side direction.

An upper part of FIG. 12 is a first layout example. The first common drive circuit 181 is divided into 181a and 181b, and for example, the number of outputs of 181a is the same as the number of outputs of 181b. The second common drive circuit 182 is divided into 182a and 182b, and for example, the number of outputs of 182a is the same as the number of outputs of 182b. The first common drive circuit 181a, the second common drive circuit 182a, the drive circuit 120, the second common drive circuit 182b, and the first common drive circuit 181b are disposed in this order along the first direction DR1, and are disposed at the first long side. The output terminal and the common drive terminal are disposed at the first long side.

A middle part of FIG. 12 is a second layout example. The second common drive circuit 182a, the drive circuit 120, and the second common drive circuit 182b are disposed in this order along the first direction DR1, and are disposed at the first long side. The output terminal and a common drive terminal for segment display are disposed at the first long side. The first common drive circuit 181a is disposed at the first short side, and the first common drive circuit 181b is disposed at the second short side. A common drive terminal for dot matrix display coupled to the first common drive circuit 181a is disposed at the first short side, and the common drive terminal for dot matrix display coupled to the first common drive circuit 181b is disposed at the second short side.

A lower part of FIG. 12 is a third layout example. The second common drive circuit 182a, the drive circuit 120, and the second common drive circuit 182b are disposed in this order along the first direction DR1, and are disposed at the first long side. The output terminal and a common drive terminal for segment display are disposed at the first long side. The first common drive circuits 181a and 181b are disposed at the second long side, the first common drive circuit 181a is disposed at the first short side, and the first common drive circuit 181b is disposed at the second short side. The common drive terminal for dot matrix display is disposed at the second long side.

An upper part of FIG. 13 is a fourth layout example. The first common drive circuit 181, the second common drive circuit 182a, the drive circuit 120, and the second common drive circuit 182b are disposed in this order along the first direction DR1, and are disposed at the first long side. The output terminal and the common drive terminal are disposed at the first long side.

A middle part of FIG. 13 is a fifth layout example. The drive circuit 120 is divided into 120a and 120b, and for example, the number of outputs of the drive circuit 120a is larger than the number of outputs of the drive circuit 120b. The first common drive circuit 181a, the second common drive circuit 182a, and the drive circuit 120a are disposed in this order along the first direction DR1, and are disposed at the first long side. An output terminal coupled to the drive circuit 120a, the common drive terminal for dot matrix display coupled to the first common drive circuit 181a, and the common drive terminal for segment display coupled to the second common drive circuit 182a are disposed at the first long side. The first common drive circuit 181b is disposed at the first short side. The common drive terminal for dot matrix display coupled to the first common drive circuit 181b is disposed at the first short side. The drive circuit 120b and the second common drive circuit 182b are disposed in this order along the second direction DR2, and are disposed at the second short side. An output terminal coupled to the drive circuit 120b and the common drive terminal for segment display coupled to the second common drive circuit 182b are disposed at the second short side.

A lower part of FIG. 13 is a sixth layout example. The first common drive circuit 181a, the second common drive circuit 182a, the drive circuit 120a, and the second common drive circuit 182b are disposed in this order along the first direction DR1, and are disposed at the first long side. The output terminal, the common drive terminal for dot matrix display coupled to the first common drive circuit 181a, and the common drive terminal for segment display are disposed at the first long side. The first common drive circuit 181b is disposed at the first short side of the second long side. The common drive terminal for dot matrix display coupled to the first common drive circuit 181b is disposed at the second long side.

Figure 14:
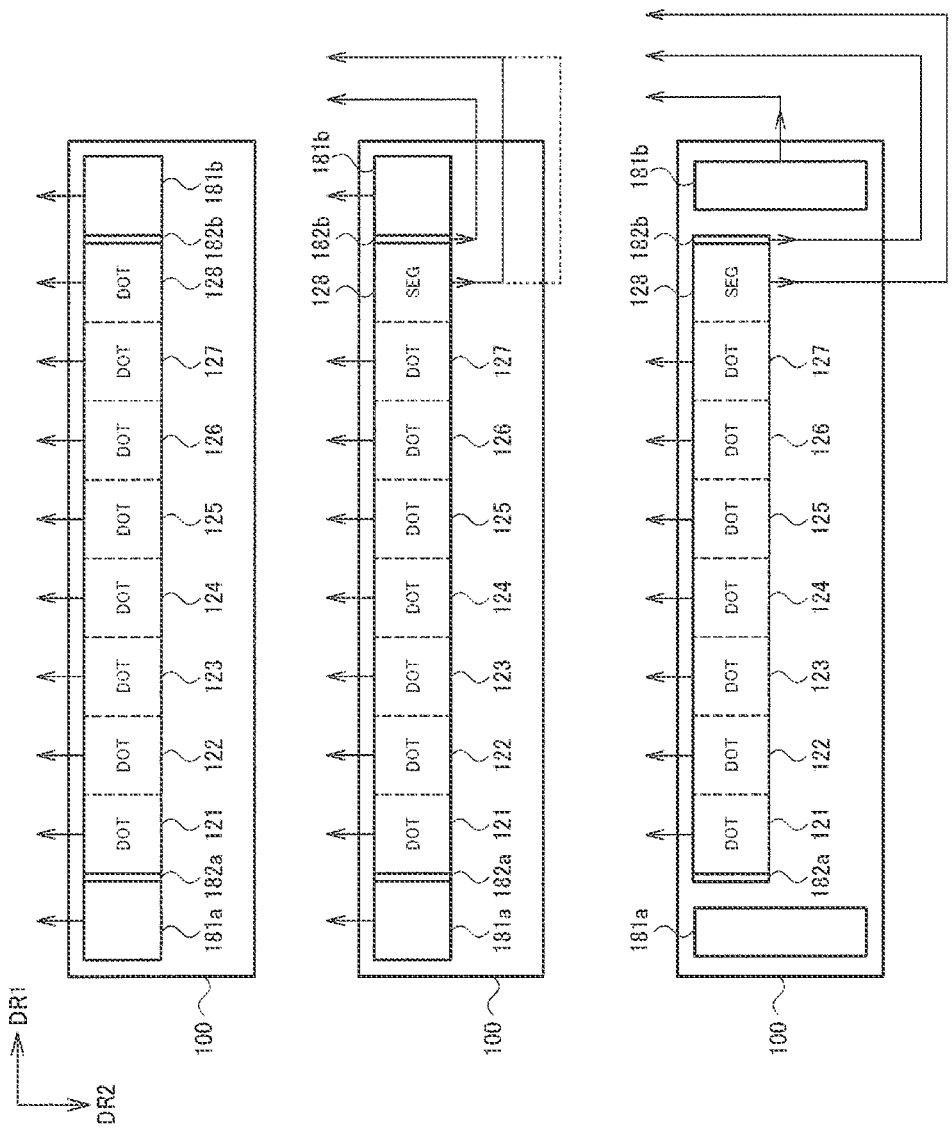
FIG. 14 is a plan view of a wiring coupling example of the integrated circuit device and a liquid crystal display panel.
Figure 15:
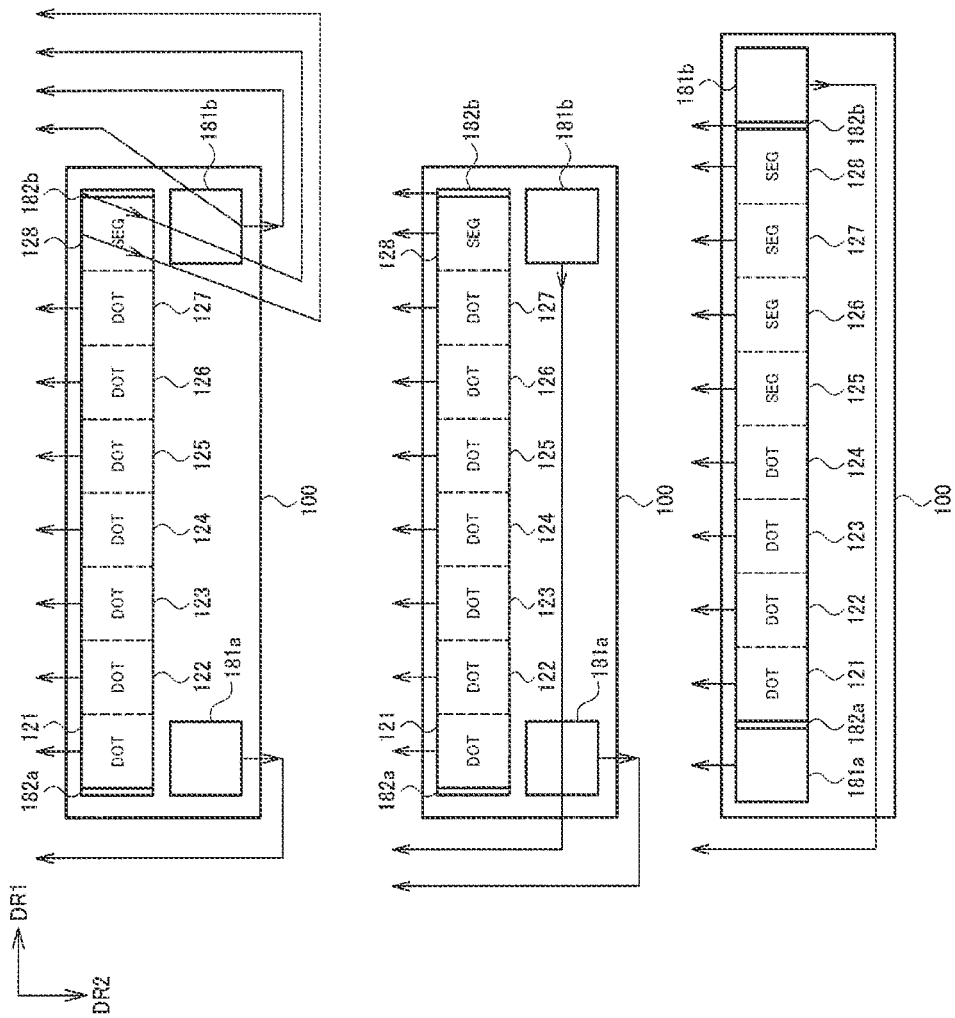
FIG. 15 is a plan view of a wiring coupling example of the integrated circuit device and the liquid crystal display panel.

FIGS. 14 and 15 are plan views of wiring coupling examples of the integrated circuit device 100 and the liquid crystal display panel 200. In these wiring coupling examples, the signal lines of the transparent conductive film do not cross each other on the glass substrate of the liquid crystal display panel 200. In each of FIGS. 14 and 15, three wiring coupling examples are shown, and each wiring coupling example is independent. Further, each wiring coupling example may be horizontally inverted.

The integrated circuit device 100 is provided with eight output terminal groups, and the drive circuit 120 includes eight drive blocks 121 to 128 corresponding to the eight output terminal groups. The number of outputs of each drive block is freely set, and is, for example, the same. Arrows indicate the signal lines of the transparent conductive film formed on the glass substrate of the liquid crystal display panel 200. When one drive block has a plurality of outputs, one arrow corresponding thereto means a plurality of signal lines coupled to a plurality of output terminals. "DOT" attached to the drive block means that the drive block outputs the drive waveform signal for dot matrix display to the dot matrix display unit 210. "SEG" attached to the drive block means that the drive block outputs the drive waveform signal for segment display to the segment display unit 220. When the first common drive circuits 181a and 181b and the second common drive circuits 182a and 182b also have a plurality of outputs, corresponding arrows indicate the plurality of signal lines coupled to the plurality of common drive terminals.

An upper part of FIG. 14 is a first wiring coupling example. In this example, it is assumed that the liquid crystal display panel 200 includes only the dot matrix display unit 210. The first common drive circuit 181a, the second common drive circuit 182a, the drive blocks 121 to 128, the second common drive circuit 182b, and the first common drive circuit 181b are disposed in this order along the first direction DR1, and are disposed at the first long side. The output terminal and the common drive terminal are disposed at the first long side. All of the drive blocks 121 to 128 are set for dot matrix display. The signal line coupled to the output terminal and the signal line coupled to the common drive terminal for dot matrix display are wired from the first long side toward the outside of the integrated circuit device 100. A direction from the first long side toward the outside of the integrated circuit device 100 is, for example, a direction opposite to the second direction DR2, and is not necessarily parallel to the direction opposite to the second direction DR2. The common drive terminal for segment display is not coupled to the signal lines.

A middle part of FIG. 14 is a second wiring coupling example. In the following example, as shown in FIG. 1, it is assumed that the dot matrix display unit 210 is provided at a left side of the liquid crystal display panel 200, and the segment display unit 220 is provided at a right side of the liquid crystal display panel 200. A circuit arrangement is similar to that of the first wiring coupling example, and the drive blocks 121 to 127 are set for dot matrix display, and the drive block 128 is set for segment display. The signal lines coupled to the output terminals of the drive blocks 121 to 127 and the signal lines coupled to the first common drive circuits 181a and 181b are wired from the first long side toward the outside of the integrated circuit device 100. The signal line coupled to the output terminal of the drive block 128 and the signal line coupled to the second common drive circuit 182b are wired from the first long side toward the second long side and then from the second short side toward the outside of the integrated circuit device 100. Alternatively, as indicated by a dotted line, the signal line coupled to the output terminal of the drive block 128 may be wired to go around the second short side after going from the second long side toward the outside of the integrated circuit device 100. The common drive terminal for segment display coupled to the second common drive circuit 182a is not coupled to the signal lines.

A lower part of FIG. 14 is a third wiring coupling example. The second common drive circuit 182a, the drive blocks 121 to 128, and the second common drive circuit 182b are disposed in this order along the first direction DR1, and are disposed at the first long side. The output terminal and the common drive terminal for segment display are disposed at the first long side. The first common drive circuit 181a and the common drive terminal for dot matrix display coupled thereto are disposed at the first short side. The first common drive circuit 181b and the common drive terminal for dot matrix display coupled thereto are disposed at the second short side. The drive blocks 121 to 127 are set for dot matrix display, and the drive block 128 is set for segment display. The signal lines coupled to the output terminals of the drive blocks 121 to 127 are wired from the first long side toward the outside of the integrated circuit device 100. The signal line coupled to the common drive terminal of the first common drive circuit 181b is wired from the second short side toward the outside of the integrated circuit device 100. The signal line coupled to the output terminal of the drive block 128 and the signal line coupled to the second common drive circuit 182b are wired to go around the second short side after going from the second long side toward the outside of the integrated circuit device 100. The signal lines are not coupled to the common drive terminals of the first common drive circuit 181a and the second common drive circuit 182a.

An upper part of FIG. 15 is a fourth wiring coupling example. The second common drive circuit 182a, the drive blocks 121 to 128, and the second common drive circuit 182b are disposed in this order along the first direction DR1, and are disposed at the first long side. The output terminal and the common drive terminal for segment display are disposed at the first long side. The first common drive circuit 181a and the common drive terminal for dot matrix display coupled thereto are disposed at the first short side of the second long side. The first common drive circuit 181b and the common drive terminal for dot matrix display coupled thereto are disposed at the second short side of the second long side. The drive blocks 121 to 127 are set for dot matrix display, and the drive block 128 is set for segment display. The signal lines coupled to the output terminals of the drive blocks 121 to 127 are wired from the first long side toward the outside of the integrated circuit device 100. The signal line coupled to the common drive terminal of the first common drive circuit 181a is wired to go around the first short side after extending from the second long side toward the outside of the integrated circuit device 100. The signal line coupled to the common drive terminal of the first common drive circuit 181b is wired from the second short side toward the outside of the integrated circuit device 100, or is wired to go around the second short side after extending from the second long side toward the outside of the integrated circuit device 100. The signal lines coupled to the output terminal of the drive block 128 and the common drive terminal of the second common drive circuit 182b are wired to go around the second short side after going from the second long side toward the outside of the integrated circuit device 100. The signal lines are not coupled to the common drive terminal of the second common drive circuit 182a.

A middle part of FIG. 15 is a fifth wiring coupling example. A circuit arrangement is similar to that of the fourth wiring coupling example. The drive blocks 121 to 127 are set for dot matrix display, and the drive block 128 is set for segment display. The signal lines coupled to the output terminals of the drive blocks 121 to 128 and the signal line coupled to the common drive terminal of the second common drive circuit 182b are wired from the first long side toward the outside of the integrated circuit device 100. The signal line coupled to the common drive terminal of the first common drive circuit 181b is wired from the first short side toward the outside of the integrated circuit device 100 after going from the second long side toward the first short side. The signal line coupled to the common drive terminal of the first common drive circuit 181a is wired to go around the first short side after extending from the second short side along the second long side toward the outside of the integrated circuit device 100. The signal line is not coupled to the common drive terminal of the second common drive circuit 182a.

A lower part of FIG. 15 is a sixth wiring coupling example. A circuit arrangement is similar to that of the first wiring coupling example. The drive blocks 121 to 124 are set for dot matrix display, and the drive blocks 125 to 128 are set for segment display. The signal line coupled to the common drive terminal of the first common drive circuit 181a, the signal lines coupled to the output terminals of the drive blocks 121 to 128, and the signal line coupled to the common drive terminal of the second common drive circuit 182b are wired from the first long side toward the outside of the integrated circuit device 100. The signal line coupled to the common drive terminal of the first common drive circuit 181b is wired from the first long side toward the second long side, from the second short side toward the first short side along the second long side, and then from the first short side toward the outside of the integrated circuit device 100.

5. Electronic Apparatus and Vehicle

Figure 16:
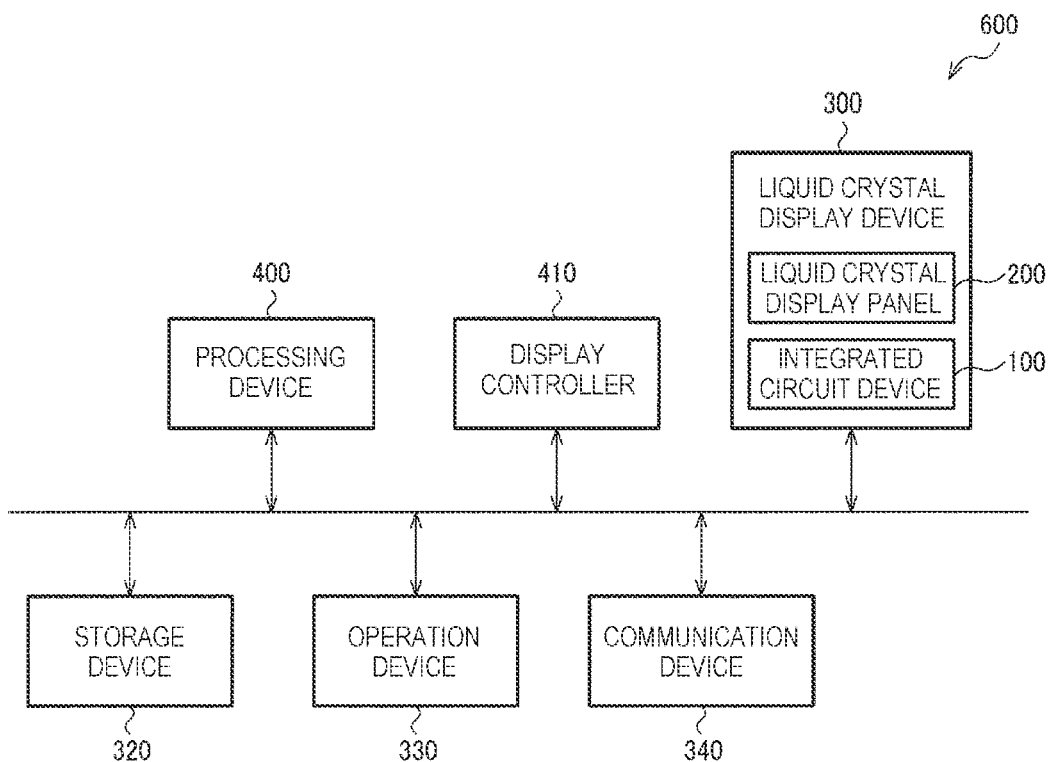
FIG. 16 is a configuration example of an electronic apparatus.

FIG. 16 is a configuration example of an electronic apparatus 600 including the integrated circuit device 100 according to the present embodiment. As the electronic apparatus of the present embodiment, various electronic apparatuses on which the liquid crystal display device 300 is mounted can be assumed. For example, as the electronic apparatus of the present embodiment, an in-vehicle device, an electronic computer, a display, an information processing device, a portable information terminal, and a portable game terminal can be assumed. The in-vehicle device is, for example, an in-vehicle display device such as a cluster panel. The cluster panel is a display panel that is provided in front of a driver seat and on which a meter is displayed.

The electronic apparatus 600 includes a processing device 400, a display controller 410, the liquid crystal display device 300, a storage device 320, an operation device 330, and a communication device 340. The liquid crystal display device 300 includes the integrated circuit device 100 and the liquid crystal display panel 200.

The operation device 330 is a user interface that receives various operations from a user. For example, the operation device 330 includes a button, a mouse, a keyboard, and a touch panel. The communication device 340 is a data interface that performs communication of display data, control data, and the like. For example, the communication device 340 is a wired communication interface such as a USB or a wireless communication interface such as a wireless LAN. The storage device 320 stores the display data input from the communication device 340. Alternatively, the storage device 320 functions as a working memory of the processing device 400. The storage device 320 is a semiconductor memory, a hard disk drive, an optical drive, and the like. The processing device 400 performs control processing of each unit of the electronic apparatus or various data processing. The processing device 400 transfers the display data received by the communication device 340 or the display data stored in the storage device 320 to the display controller 410. The processing device 400 is a processor such as a CPU. The display controller 410 converts the received display data into a format that can be received by the liquid crystal display device 300, and outputs the converted display data to the integrated circuit device 100. The integrated circuit device 100 drives the liquid crystal display panel 200 based on the display data transferred from the display controller 410.

Figure 17:
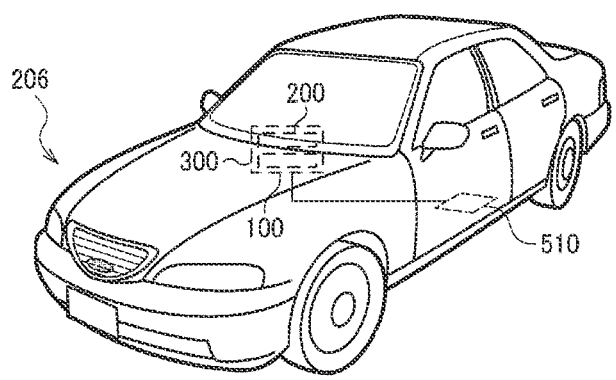
FIG. 17 is an example of a vehicle.

FIG. 17 is a configuration example of a vehicle including the integrated circuit device 100 according to the present embodiment. The vehicle is, for example, an apparatus or a device that includes a drive mechanism such as an engine or a motor, a steering mechanism such as a steering wheel or a rudder, and various electronic apparatuses, and moves on a ground, in a sky, or at a sea. As the vehicle of the present embodiment, for example, various vehicles such as a car, an airplane, a motorcycle, a ship, a traveling robot, and a walking robot can be assumed. FIG. 17 schematically shows an automobile 206 as a specific example of the vehicle. The automobile 206 includes the liquid crystal display device 300 and a control device 510 that controls each part of the automobile 206. The liquid crystal display device 300 includes the integrated circuit device 100 and the liquid crystal display panel 200. The control device 510 generates the display data for presenting information such as a vehicle speed, a remaining fuel amount, a travel distance, and settings of various devices to the user, and transmits the display data to the integrated circuit device 100. The integrated circuit device 100 drives the liquid crystal display panel 200 based on the display data. Accordingly, the information is displayed on the liquid crystal display panel 200.

An integrated circuit device according to the present embodiment described above includes a voltage supply circuit and a drive circuit. The voltage supply circuit supplies a common voltage, a first positive polarity voltage higher than the common voltage, a second positive polarity voltage higher than the first positive polarity voltage, a first negative polarity voltage lower than the common voltage, and a second negative polarity voltage lower than the first negative polarity voltage. The drive circuit outputs a first drive waveform signal for dot matrix display based on the common voltage, the first positive polarity voltage, the second positive polarity voltage, the first negative polarity voltage, and the second negative polarity voltage, and outputs a second drive waveform signal for segment display based on the common voltage, the first positive polarity voltage, and the first negative polarity voltage.

According to the present embodiment, the voltage supply circuit generates a plurality of voltages centered on the common voltage, and the drive circuit generates the drive waveform signal for dot matrix display and the drive waveform signal for segment display using the plurality of voltages. Accordingly, in any one of the dot matrix display and the segment display, the drive waveform signal centered on the common voltage is generated, and thus burn-in of the liquid crystal display panel due to a difference in center voltages would not occur. Further, since the voltage supply circuit and the drive circuit can be shared by the dot matrix display and the segment display, the circuit can be simplified and the cost can be reduced.

Further, the integrated circuit device according to the present embodiment may include an output terminal. The drive circuit may output the first drive waveform signal to the output terminal based on the common voltage, the first positive polarity voltage, the second positive polarity voltage, the first negative polarity voltage, and the second negative polarity voltage when the output terminal is set as an output terminal for dot matrix display. The drive circuit may output the second drive waveform signal to the output terminal based on the common voltage, the first positive polarity voltage, and the first negative polarity voltage when the output terminal is set as an output terminal for segment display.

According to the present embodiment, one output terminal can be used as the output terminal for dot matrix display or the output terminal for segment display. That is, according to the configuration of the liquid crystal display panel, it is possible to select whether the output terminal is set for the dot matrix display or the segment display. Further, the drive circuit can be a circuit that selects any one of the first positive polarity voltage, the second positive polarity voltage, the first negative polarity voltage, and the second negative polarity voltage. Accordingly, it is not necessary to separately provide a drive circuit for dot matrix display or a drive circuit for segment display, and the circuit configuration can be simplified.

Further, the integrated circuit device according to the present embodiment may include a control circuit that sets the output terminal as the output terminal for dot matrix display or the output terminal for segment display.

In this way, the control circuit can set the output terminal as the output terminal for the dot matrix display or the output terminal for the segment display based on setting information stored in a storage circuit of the control circuit.

Further, in the present embodiment, the voltage supply circuit may include a first regulator configured to generate the first negative polarity voltage based on the power supply voltage.

In this way, the first regulator generates the first negative polarity voltage of the voltages generated by the voltage supply circuit.

Further, in the present embodiment, the voltage supply circuit may include a second regulator configured to generate the second positive polarity voltage obtained by multiplying the first negative polarity voltage by four with reference to the second negative polarity voltage.

In this way, the second positive polarity voltage of the voltages generated by the voltage supply circuit is generated by the second regulator. The second positive polarity voltage is obtained by multiplying the first negative polarity voltage by four with reference to the second negative polarity voltage.

Further, in the present embodiment, the second regulator may generate the first positive polarity voltage and the common voltage that divide a voltage between the first negative polarity voltage and the second positive polarity voltage into three equal parts.

The second positive polarity voltage is obtained by multiplying the first negative polarity voltage by four with reference to the second negative polarity voltage, and the first positive polarity voltage and the common voltage are obtained by dividing the voltage between the first negative polarity voltage and the second positive polarity voltage into three equal parts. Accordingly, the intervals between the second positive polarity voltage, the first positive polarity voltage, the common voltage, the first negative polarity voltage, and the second negative polarity voltage are the same.

Further, in the present embodiment, the first regulator may be an electronic volume configured to perform contrast adjustment of segment display.

In this way, the first negative polarity voltage is adjusted by the electronic volume of the first regulator. Since the second positive polarity voltage is obtained by multiplying the first negative polarity voltage by four with reference to the second negative polarity voltage, the second positive polarity voltage is also adjusted by adjusting the first negative polarity voltage. Then, since the intervals between the second positive polarity voltage, the first positive polarity voltage, the common voltage, the first negative polarity voltage, and the second negative polarity voltage are the same, the intervals are also adjusted. Since the segment display is performed by the five voltages, the contrast of the segment display is adjusted by the electronic volume of the first regulator.

Further, in the present embodiment, the voltage supply circuit may include a third regulator. The third regulator may generate a third positive polarity voltage higher than the second positive polarity voltage and a third negative polarity voltage lower than the second negative polarity voltage, and supply the third positive polarity voltage and the third negative polarity voltage to the common drive circuit for dot matrix display.

In this way, the third regulator generates the third positive polarity voltage and the third negative polarity voltage of the voltages generated by the voltage supply circuit.

Further, in the present embodiment, the third regulator may be an electronic volume that performs contrast adjustment for dot matrix display.

The third positive polarity voltage and the third negative polarity voltage are adjusted by the electronic volume of the third regulator. Since the common drive waveform signal for dot matrix display is generated using the third positive polarity voltage, the common voltage, and the third negative polarity voltage, the contrast of the dot matrix display is adjusted by adjusting the third positive polarity voltage and the third negative polarity voltage.

Further, an electronic apparatus according to the present embodiment includes the integrated circuit device described above.

Further, a vehicle according to the present embodiment includes the integrated circuit device described above.

Although the present embodiment has been described in detail as described above, it will be readily apparent to those skilled in the art that many modifications may be made without departing substantially from novel matters and effects of the present disclosure. Therefore, all such modifications are intended to be included within the scope of the present disclosure. For example, a term cited with a different term having a broader meaning or the same meaning at least once in the present disclosure or in the drawings can be replaced with the different term in any place in the present disclosure or in the drawings. All combinations of the present embodiment and the modifications are also included in the scope of the present disclosure. Further, the configurations, operations, and the like of the integrated circuit device, the liquid crystal display panel, the liquid crystal display device, the electronic apparatus, the vehicle, and the like are not limited to those described in the present embodiment, and various modifications can be made.

What is claimed is:

1. An integrated circuit device comprising:
a voltage supply circuit configured to supply a common voltage, a first positive polarity voltage higher than the common voltage, a second positive polarity voltage higher than the first positive polarity voltage, a first negative polarity voltage lower than the common voltage, and a second negative polarity voltage lower than the first negative polarity voltage; and
a drive circuit configured to output a first drive waveform signal for dot matrix display based on the common voltage, the first positive polarity voltage, the second positive polarity voltage, the first negative polarity voltage, and the second negative polarity voltage, and output a second drive waveform signal for segment display based on the common voltage, the first positive polarity voltage, and the first negative polarity voltage.

2. The integrated circuit device according to claim 1, further comprising:
an output terminal, wherein
the drive circuit is configured to
output the first drive waveform signal to the output terminal based on the common voltage, the first positive polarity voltage, the second positive polarity voltage, the first negative polarity voltage, and the second negative polarity voltage when the output terminal is set as an output terminal for dot matrix display, and
output the second drive waveform signal to the output terminal based on the common voltage, the first positive polarity voltage, and the first negative polarity voltage when the output terminal is set as an output terminal for segment display.

3. The integrated circuit device according to claim 2, further comprising:
a control circuit configured to set the output terminal as the output terminal for dot matrix display or the output terminal for segment display.

4. The integrated circuit device according to claim 1, wherein
the voltage supply circuit includes a first regulator configured to generate the first negative polarity voltage based on a power supply voltage.

5. The integrated circuit device according to claim 4, wherein
the voltage supply circuit includes a second regulator configured to generate the second positive polarity voltage obtained by multiplying the first negative polarity voltage by four with reference to the second negative polarity voltage.

6. The integrated circuit device according to claim 5, wherein
the second regulator is configured to generate the first positive polarity voltage and the common voltage that divide a voltage between the first negative polarity voltage and the second positive polarity voltage into three equal parts.

7. The integrated circuit device according to claim 4, wherein
the first regulator is an electronic volume configured to perform contrast adjustment of segment display.

8. The integrated circuit device according to claim 1, wherein
the voltage supply circuit includes a third regulator configured to generate a third positive polarity voltage higher than the second positive polarity voltage and a third negative polarity voltage lower than the second negative polarity voltage, and to supply the third positive polarity voltage and the third negative polarity voltage to a common drive circuit for dot matrix display.

9. The integrated circuit device according to claim 8, wherein
the third regulator is an electronic volume configured to perform contrast adjustment of dot matrix display.

10. An electronic apparatus comprising:
the integrated circuit device according to claim 1.

11. A vehicle comprising:
the integrated circuit device according to claim 1.

* * * * *